United States Patent
Tomita et al.

(10) Patent No.: US 7,814,417 B2
(45) Date of Patent: Oct. 12, 2010

(54) DOCUMENT PROCESSING METHOD AND SYSTEM THEREFOR

(75) Inventors: Makoto Tomita, Kawasaki (JP); Junko Sato, Kawasaki (JP); Satoshi Tanaka, Kawasaki (JP); Yuki Kusakabe, Kawasaki (JP); Tsuyoshi Itami, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1230 days.

(21) Appl. No.: 11/244,706

(22) Filed: Oct. 6, 2005

(65) Prior Publication Data

US 2006/0075339 A1 Apr. 6, 2006

(30) Foreign Application Priority Data

Oct. 6, 2004 (JP) .............................. 2004-294271

(51) Int. Cl.
*G06F 17/00* (2006.01)
(52) U.S. Cl. ..................... 715/273; 715/274; 715/255
(58) Field of Classification Search .................. 715/255, 715/273, 274
See application file for complete search history.

(56) References Cited

U.S. PATENT DOCUMENTS

| | | | | |
|---|---|---|---|---|
| 5,130,806 A * | 7/1992 | Reed et al. | .................. | 358/296 |
| 6,924,826 B1 * | 8/2005 | Nakagiri et al. | ............. | 715/700 |
| 7,242,490 B1 * | 7/2007 | Palmer et al. | ............... | 358/1.15 |
| 2002/0097422 A1 * | 7/2002 | Matthews et al. | ........... | 358/1.14 |
| 2003/0056179 A1 * | 3/2003 | Mori | ........................... | 715/530 |
| 2003/0056180 A1 * | 3/2003 | Mori | ........................... | 715/530 |
| 2004/0111675 A1 * | 6/2004 | Mori et al. | ................... | 715/513 |
| 2004/0165220 A1 * | 8/2004 | Fukuda | ........................ | 358/400 |
| 2004/0239956 A1 * | 12/2004 | Araumi | ....................... | 358/1.1 |
| 2005/0280837 A1 * | 12/2005 | Ono et al. | ..................... | 358/1.1 |
| 2008/0174816 A1 * | 7/2008 | Inoue | ......................... | 358/1.15 |

FOREIGN PATENT DOCUMENTS

| | | |
|---|---|---|
| JP | 04-205458 A | 7/1992 |
| JP | 06-203023 A | 7/1994 |
| JP | 11-134327 | 5/1999 |
| JP | 2003-091520 | 3/2003 |

OTHER PUBLICATIONS

Microsoft Word for Windows Dictionary of Word function Japan, Microsoft Co., Ltd. Nov. 5, 1993, second edition, pp. 552-555, 1103-1105. (with translation).

* cited by examiner

*Primary Examiner*—Thu Huynh
(74) *Attorney, Agent, or Firm*—Cowan, Liebowitz, Latman, P.C.

(57) ABSTRACT

According to this invention, a document processing apparatus capable of editing document information includes an operation instruction input unit which can input an operation instruction to be saved, an operation instruction save unit which saves the operation instruction input by the operation instruction input unit together with document information, an operation instruction display unit which displays an image corresponding to the saved operation instruction, and an operation instruction execution unit which reads out, when the image displayed on the operation instruction display unit is designated, an operation instruction corresponding to the image from the operation instruction save unit, and executes the operation instruction for the document information.

3 Claims, 28 Drawing Sheets

FIG. 4A

| NO | ATTRIBUTE INFORMATION | | REMARKS |
|---|---|---|---|
| 1 | PRINTING METHOD | SINGLE SIDE/ DOUBLE SIDE/ BOOKBINDING PRINTING | |
| 2 | PAPER SIZE | DOCUMENT SIZE/ FIXED SIZE | · Z-FOLD IS DESIGNATED WHEN "A4+A3", "B4+B3", OR "LETTER+LEDGER (11x17)" IS DESIGNATED.<br>· DOCUMENT SIZE OF FIRST CHAPTER/PAGE IS AUTOMATICALLY SELECTED WHEN BOOKBINDING PRINTING OR N-up PRINTING IS DESIGNATED. |
| 3 | PAPER ORIENTATION | PORTRAIT/LANDSCAPE | · SELECTABLE ONLY FOR FIXED SIZE |
| 4 | BINDING MARGIN / BINDING DIRECTION | | · SHIFT/ENLARGEMENT & REDUCTION CAN BE DESIGNATED. |
| 5 | N-up PRINTING | NUMBER OF PAGES/LAYOUT ORDER/BORDER LINE/LAYOUT POSITION, ETC. | · LAYOUT POSITION: NINE PATTERNS<br>· X1 PRINTING CAN BE DESIGNATED. |
| 6 | ENLARGEMENT/ REDUCTION | ON/OFF | ON/OFF CAN BE AUTOMATICALLY DESIGNATED WHEN PAPER SIZE IS FIXED SIZE OR N-up PRINTING IS SELECTED. |
| 7 | WATERMARK | | · WATERMARK CAN BE DESIGNATED INDIVIDUALLY IN LOGICAL OR PHYSICAL PAGES.<br>· ALL CHAPTERS/PAGES ARE TARGETED. |

FIG. 4B

| | | | |
|---|---|---|---|
| 8 | HEADER/FOOTER | | · HEADER/FOOTER CAN BE DESIGNATED INDIVIDUALLY IN LOGICAL OR PHYSICAL PAGES.<br>· ALL CHAPTERS/PAGES ARE TARGETED. |
| 9 | DELIVERY METHOD | STAPLING/PUNCH HOLE | · STAPLING/PUNCHING ONLY IN SINGLE/DOUBLE SIDE PRINTING<br>· STAPLING AT ONE/TWO PORTIONS |
| 10 | DETAILS OF BOOK BINDING | OPENING DIRECTION/SADDLE STITCH/ENLARGEMENT & REDUCTION DESIGNATION/ BINDING MARGIN/FASCICLE DESIGNATION, ETC. | · ONLY IN BOOKBINDING PRINTING |
| 11 | FRONT/BACK COVER | | · PRINTING IS DESIGNATED FOR 1/2 FRONT COVER OR 1/2 BACK COVER.<br>· FEED PORT (INCLUDING INSERTER) IS DESIGNATED. |
| 12 | INDEX PAPER | | · PRINTING OF CHARACTER STRING ON INDEX PORTION OR ANNOTATION ON INDEX PAPER CAN BE SET.<br>· BOOKBINDING PRINTING CANNOT BE DESIGNATED. |
| 13 | SLIP SHEET | | · FEED PORT (INCLUDING INSERTER) IS DESIGNATED.<br>· DOCUMENT DATA CAN BE PRINTED ON INSERTED PAPER.<br>· BOOKBINDING PRINTING CANNOT BE DESIGNATED. |
| 14 | CHAPTER SEGMENTATION | "NONE"/"PAGE BREAK"/ "PAPER CHANGE" | · "PAPER CHANGE" IS FIXED WHEN INDEX PAPER OR SLIP SHEET IS DESIGNATED.<br>· "PAPER CHANGE" IN SINGLE SIDE PRINTING |

FIG. 5

| NO | ATTRIBUTE INFORMATION | | REMARKS |
|---|---|---|---|
| 1 | PAPER SIZE | DOCUMENT SIZE/ FIXED SIZE | • "PAPER CHANGE" IS AUTOMATICALLY DESIGNATED WHEN FIXED SIZE IS SELECTED.<br>• WHEN A PLURALITY OF PAPER SHEETS ARE SELECTED BY BOOK, PAPER SIZE CAN BE CHANGED TO ONLY DESIGNATED PAPER. PAPER SIZE CAN BE CHANGED EVEN WITH DESIGNATION COMPLYING WITH BOOK. |
| 2 | PAPER ORIENTATION | PORTRAIT/LANDSCAPE | • SELECTABLE ONLY FOR FIXED SIZE |
| 3 | N-up PRINTING DESIGNATION | NUMBER OF PAGES/ LAYOUT ORDER/ BORDER LINE/ LAYOUT POSITION, ETC. | • LAYOUT POSITION: NINE PATTERNS<br>• X1 PRINTING CAN BE DESIGNATED. |
| 4 | ENLARGEMENT/ REDUCTION | ON / OFF | • ON/OFF CAN BE AUTOMATICALLY DESIGNATED WHEN PAPER SIZE IS FIXED SIZE OR N-up PRINTING IS SELECTED. |
| 5 | WATERMARK | DISPLAY/NON-DISPLAY | • WHETHER TO DISPLAY ALL WATERMARKS DESIGNATED BY BOOK IS DESIGNATED. |
| 6 | HEADER/FOOTER | DISPLAY/NON-DISPLAY | • WHETHER TO DISPLAY ALL HEADERS/FOOTERS DESIGNATED BY BOOK IS DESIGNATED. |
| 7 | DELIVERY METHOD | STAPLING | • STAPLING CAN BE SET OFF WHEN STAPLING IS DESIGNATED BY BOOK. DEFAULT VALUE IS "ON". |

FIG. 6

| NO | ATTRIBUTE INFORMATION | | REMARKS |
|---|---|---|---|
| 1 | PAGE ROTATION DESIGNATION | | · 0°/90°/180°/270° CAN BE DESIGNATED. |
| 2 | WATERMARK | DISPLAY/NON-DISPLAY | · WHETHER TO DISPLAY ALL WATERMARKS DESIGNATED BY BOOK IS DESIGNATED. |
| 3 | HEADER/FOOTER | DISPLAY/NON-DISPLAY | · WHETHER TO DISPLAY ALL HEADERS/FOOTERS DESIGNATED BY BOOK IS DESIGNATED. |
| 4 | ZOOM | 50%–200% | · MAGNIFICATION RATIO RELATIVE TO SIZE WHICH IS FIT IN VIRTUAL LOGICAL PAGE REGION AND SET AS 100% IS DESIGNATED. |
| 5 | LAYOUT POSITION | | · NINE FIXED PATTERNS, ARBITRARY POSITION IS DESIGNATED. |
| 6 | ANNOTATION | | |
| 7 | VARIABLE ITEM | | |
| 8 | PAGE SEPARATION | | |
| 9 | OPERATION INSTRUCTION COMMENT | | OPERATION CONTENT, TEXT COMMENT |

BOOK

| PAGE SETUP | DECORATION | EDIT | PAPER SOURCE |

PAPER SIZE :  [MATCH PAGE SIZE ▶]
☑ ZOOM FOR PAPER — 1401

ORIENTATION : [A] ● PORTRAIT  [A] ○ LANDSCAPE

PAGE LAYOUT : [1 PAGE PER SHEET ▶]
ORDER : [NONE ▶]
BORDER LINE : [NONE ▶]

☐ ZOOM FOR AREA — 1402
ZOOM ARRANGE : [CANTER ▶]

[OK]  [CANCEL]  [APPLY]  [DEFAULT]  [HELP]

FIG. 15

CHAPTER — ? X

| PAGE SETUP | FINISHING | EDIT | PAPER SOURCE |

☑ FOLLOW BOOK ATTRIBUTE — 1501

PAPER SIZE: [ MATCH PAGE SIZE ▶ ]

☑ ZOOM FOR PAPER

ORIENTATION: ⊙ PORTRAIT  ○ LANDSCAPE

☑ FOLLOW BOOK ATTRIBUTE — 1502

PAGE LAYOUT: [ 1 PAGE PER SHEET ▶ ]

ORDER: [ NONE ▶ ]

BORDER LINE: [ NONE ▶ ]

☑ FOLLOW BOOK ATTRIBUTE — 1503

☐ ZOOM FOR AREA

ZOOM ARRANGE: [ CANTER ▶ ]

[ DEFAULT ]

[ OK ]  [ CANCEL ]  [ APPLY ]  [ HELP ]

| CHAPTER | | | |
|---|---|---|---|
| PAGE SETUP | FINISHING | EDIT | PAPER SOURCE |

☐ FOLLOW BOOK ATTRIBUTE ~1501

PAPER SIZE : [A4 ▼]

☑ ZOOM FOR PAPER

ORIENTATION : [A] ● PORTRAIT  [A] ○ LANDSCAPE

☐ FOLLOW BOOK ATTRIBUTE ~1502

PAGE LAYOUT : [▦ 4 PAGE PER SHEET ▼]

ORDER : [▦ ACROSS FROM UPPERLEFT ▼]

BORDER LINE : [NONE ▼]

☑ FOLLOW BOOK ATTRIBUTE ~1503

☐ ZOOM FOR AREA

ZOOM ARRANGE : [☐ CANTER ▼]

[OK] [CANCEL] [APPLY] [DEFAULT]
[HELP]

FIG. 18

| PAGE | | |
|---|---|---|
| PAGE SETUP | EDIT | |

PAGE ROTATION : [270 DEGREE ▼] ~1701

☑ FOLLOW CHAPTER ATTRIBUTE

☐ NO ZOOM

☐ FREE ZOOM  [100] ◄► ▶  % (50 to 200)

ZOOM ARRANGE : ☐ CANTER    [SET POSITION ...]

[OK]  [CANCEL]  [APPLY]  [DEFAULT]  [HELP]

| | OPERATION INSTRUCTION COMMENT | |
|---|---|---|
| 1 | OPERATION TARGET | ~2001 |
| 2 | OPERATION ITEM | ~2002 |
| 3 | TEXT COMMENT | ~2003 |
| 4 | CHARACTER DECORATION DESIGNATION | ~2004 |
| 5 | MARKER COLOR DESIGNATION | ~2005 |

Proofreading comment Properties

| Operation Settings | Colors and Settings | Text Settings | 2201 |

Specify Range by : Chapters ▼ — 2202 / 2202a
Range : 1-2
Operation : Move to ▼ — 2203 / 2204
Location : 6

Comment : Move chapter 1-2 to chapter 6 — 2205

☑ Execute on double click — 2206

OK   CANCEL   HELP

DOCUMENT PROCESSING METHOD AND SYSTEM THEREFOR

FIELD OF THE INVENTION

The present invention relates to a document processing method and a system therefor, e.g., a document processing method and a system therefor, which provide a function of combining output data generated by various programs such as a document processing program and image editing program into one document and editing the resultant document and, more particularly, to a document processing method in a system made up of a printer and an information processing apparatus such as a personal computer and a system therefor.

BACKGROUND OF THE INVENTION

Conventionally, in order to create one document by combining printing products generated by various applications, there has been provided a document processing system which provides a function of converting output data generated by various programs such as a document processing program and image editing program into electronic documents, combining them into one document, and editing the combined electronic document (see, e.g., Japanese Patent Laid-Open No. 2003-091520).

Such a document processing system can designate or change a format and print form so as to, e.g., add page numbers, rearrange pages, combine a plurality of original pages into one page as a printing product (to be referred to as a physical page or print page.), change single sided printing to double sided printing, or execute staple designation.

Since this document processing system is formed for use in a general office, a user himself/herself is naturally supposed to form a document. However, if the user (creator) who created the document is physically separate from an operator (to be referred to as a proofreader) who executes proofreading and printing, the document cannot readily be proofread. For example, when the proofreader proofreads a document provided by the user, the proofreader generally receives an electronic document containing a format or print form, and directly rewrites the electronic document while saving its proofreading log. Alternatively, the proofreader adds an annotation to the electronic document, and the creator rewrites the electronic document while interpreting a proofreader's instruction. This operation is executed to record how the creator and proofreader have individually proofread the electronic document because there is a possibility that the document needs to be restored to the condition before proofreading depending on circumstances.

As described above, assume that the creator and proofreader proofread an electronic document, and the electronic document itself is rewritten directly. In this case, since an actual proofreading operation is executed regardless of a creator's intention about the proofreading contents, it takes much time to modify again or restore the proofreading log of the document.

Alternatively, in the method of adding an annotation to an electronic document, the creator must rewrite the electronic document while interpreting the proofreader's instruction. This gives much trouble to the creator, resulting in a decrease in productivity. Furthermore, since the creator interprets the instruction, a notification failure readily occurs so the proofreader's intention cannot correctly be reflected.

SUMMARY OF THE INVENTION

The present invention has been made in consideration of the above prior arts, and has as its object to provide a document processing apparatus and method which allow a proofreader to instruct proofreading using a document processing program without directly rewriting an electronic document containing a format and print form and accurately notify the creator of the proofreading instruction. It is another object of the present invention to provide a document processing apparatus and method which allow a creator to rewrite an electronic document on the basis of a proofreading instruction by applying a proofreader's instruction to the electronic document with a simple operation so as to greatly save labors.

In order to achieve the above objects, the present invention has the following arrangement.

A document processing apparatus capable of editing document information comprises:

an operation instruction input unit which can input an operation instruction to be saved;

an operation instruction save unit which saves the operation instruction input by the operation instruction input unit together with document information;

an operation instruction display unit which displays an image corresponding to the saved operation instruction; and an operation instruction execution unit which reads out, when the image displayed on the operation instruction display unit is designated, an operation instruction corresponding to the image from the operation instruction save unit, and executes the operation instruction for the document information.

Alternatively, a document processing apparatus capable of editing a structured document comprises:

an operation input unit which can input an editing operation associated with a structure of the structured document;

a save unit which saves, as part of the structured document, editing instruction information corresponding to the editing operation input by the operation input unit; and an editing processing unit which executes an editing process corresponding to the editing instruction information saved in the save unit for the structured document in accordance with an instruction by an operator.

According to the present invention, a proofreader can instruct proofreading using a document processing program without directly rewriting an electronic document containing a format and print form, and the creator can be accurately notified of the proofreading instruction. In addition, a creator can rewrite an electronic document on the basis of a proofreading instruction by applying a proofreader's instruction to the electronic document with a simple operation, thus greatly saving labors.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIGS. 4A and 4B are tables showing a list of book attributes;

FIG. 5 is a table showing a list of chapter attributes;

FIG. 6 is a table showing a list of page attributes;

FIG. 14 is a view showing an example of a dialog window for setting a whole document serving as the uppermost layer of the data structure;

FIG. 15 is a view showing an example of a dialog window for setting a chapter serving as the intermediate layer of the data structure;

FIG. 16 is a view showing an example of setting a unique attribute in the dialog window of FIG. 15;

FIG. 18 is a view showing an example of changing a setting value in the dialog window of FIG. 17;

FIG. 20 is a view showing a list of details of operation instruction comment settings for page attributes;

FIG. 22 is a view showing an example of a user interface of a detail setting window of an operation instruction comment;

DETAILED DESCRIPTION OF THE PREFERRED EMBODIMENT

[Outline of Document Processing System According to Embodiment]

An embodiment of the present invention will be described in detail below with reference to the accompanying drawings. The outline of a document processing system according to this embodiment will be described with reference to FIGS. 1 to 12. In the document processing system, a data file created by a general application is converted into an electronic document file by an electronic document writer. A bookbinding application provides a function of editing the electronic document file. In this embodiment, a general application, electronic document writer, bookbinding application, and electronic document despooler are separately described for distinction between these functions. However, a package provided to the user is not limited to them, and an application or graphic engine as a combination of them may be provided, details of which will be described below.

<Example of Software Configuration of Document Processing System According to Embodiment>

Figure 1:
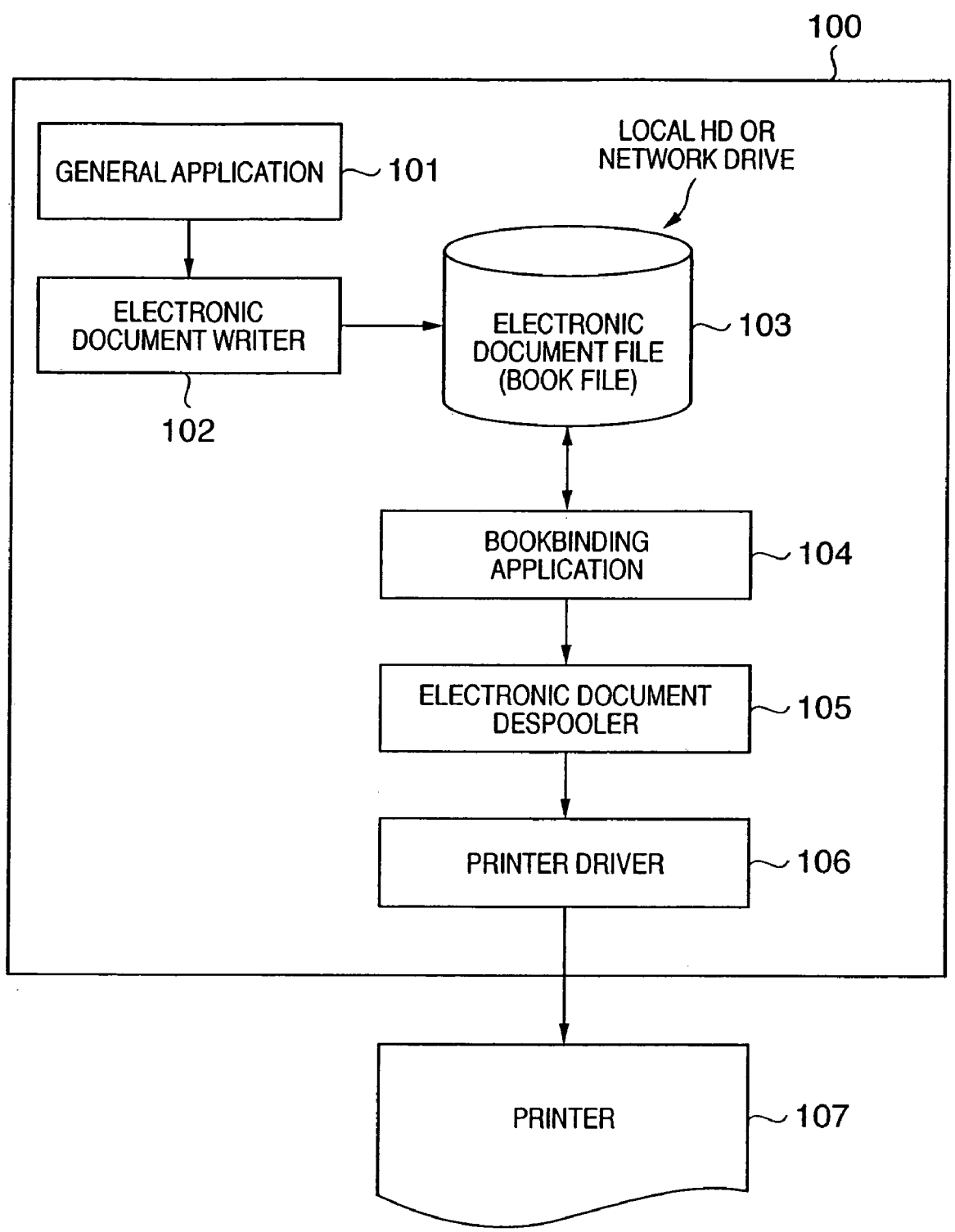
FIG. 1 is a block diagram showing an example of the software configuration of a document processing system according to an embodiment.

FIG. 1 is a block diagram showing the software configuration of the document processing system according to this embodiment. The document processing system is implemented by a digital computer 100 (to be also referred to as a host computer hereafter) as a suitable embodiment of a document processing apparatus (information processing apparatus) according to the present invention. A general application 101 is an application program which provides functions such as wordprocessing, spreadsheet, photo-retouch, draw, paint, presentation, and text editing. The general application 101 has a printing function for the OS (Operating System). Such applications utilize a predetermined interface (generally called GDI) provided by the OS in printing application data such as created document data or image data. To print created data, the application 101 transmits an output command (called a GDI function) which is determined in advance for the output module of the OS providing the interface and has an OS-dependent format. The output module receives the output command, converts the command into a format processible by an output device such as a printer, and outputs the converted command (called a DDI function). Since the format processible by the output device changes depending on the type of device, the manufacturer, and the model, a device driver is provided for each device. The OS converts a command by using the device driver to generate print data, and combines the print data by JL (Job Language) to generate a print job. When the OS is Microsoft Windows®, the output module is a GDI (Graphical Device Interface) module.

An electronic document writer 102 is an improvement of the above-mentioned device drivers, and is a software module provided to implement the document processing system. The electronic document writer 102 does not target a specific output device, and generates an output command of a format processible by a bookbinding application 104 or printer driver 106 (to be described later). The format (to be referred to as an "electronic document format" hereinafter) converted by the electronic document writer 102 is not particularly limited as far as each original page can be expressed by a detailed format. Of substantial standard formats, for example, the PDF format by Adobe Systems and the SVG format can be adopted as electronic document formats.

When the application 101 utilizes the electronic document writer 102, the electronic document writer 102 is designated as a device driver used for output, and then caused to execute printing. An electronic document file created by the electronic document writer 102 does not have a complete electronic document file format. For this reason, the electronic document writer 102 is designated as a device driver by the bookbinding application 104, and executes conversion of application data into an electronic document file under the management of the bookbinding application 104. The bookbinding application 104 completes a new incomplete electronic document file generated by the electronic document writer 102 as an electronic document file having the following format. In case of necessity to definitely discriminate these files, a file created by the electronic document writer 102 will be called an electronic document file, and an electronic document file given a structure by the bookbinding application will be called a book file. If these files need not be particularly discriminated, a document file generated by an application, an electronic document file, and a book file are called document files (or document data or document information).

As described above, the electronic document writer 102 is designated as a device driver, and the general application 101 prints the data. Application data is converted into an electronic document format in pages (to be referred to as "logical pages" or "original pages" hereinafter) defined by the application 101. The converted data is stored as an electronic document file 103 in a storage medium such as a hard disk. The hard disk may be the local drive of the computer which implements the document processing system according to this embodiment, or when the computer is connected to a network, may be a drive provided on the network.

The bookbinding application 104 provides the user with a function of loading and editing the electronic document file or book file 103. The bookbinding application 104 provides no function of editing the contents of each page, but a function of editing a chapter or book structure (to be described later) made up of pages as a minimum unit.

To print the book file 103 edited by the bookbinding application 104, the bookbinding application 104 activates the electronic document despooler 105. The electronic document despooler 105 is a program module which is installed in the computer together with the bookbinding application. The electronic document despooler 105 is used to output drawing data to a printer driver in printing a document (book file) used by the bookbinding application. The electronic document despooler 105 reads out a designated book file from the hard disk. To print each page in a format described in the book file, the electronic document despooler 105 generates an output command complying with the output module of the OS described above, and outputs the command to the output module (not shown). At this time, the driver 106 of a printer 107 used as an output device is designated as a device driver. The output module converts the output command received using the designated printer driver 106 of the printer 107 into a device command interpretable by the printer 107. The device command is transmitted to the printer 107, which prints an image corresponding to the command.

<Example of Hardware Configuration of Document Processing System According to Embodiment>

Figure 2:
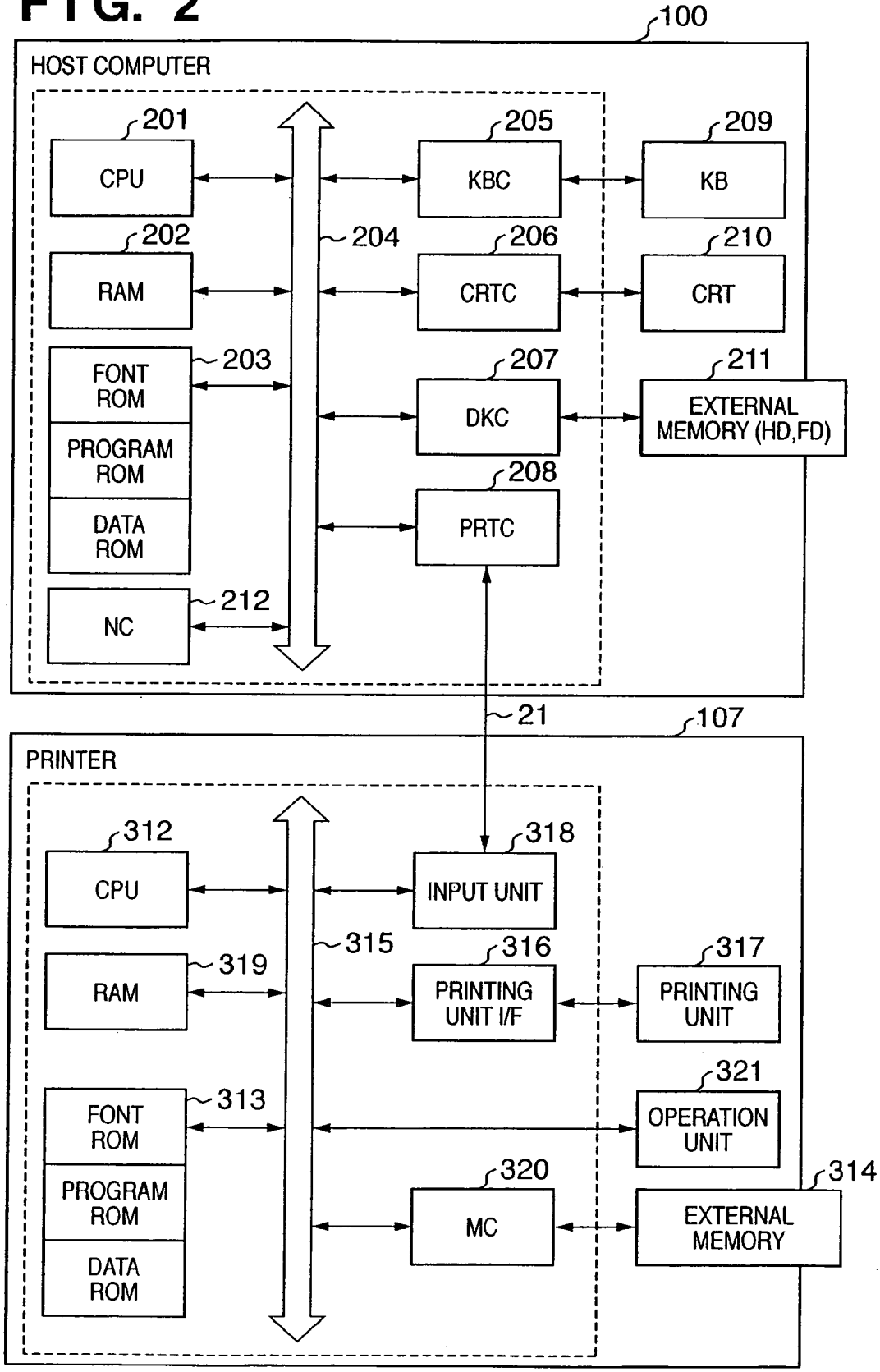
FIG. 2 is a block diagram showing an example of a hardware configuration which implements the document processing system according to the embodiment.

FIG. 2 is a block diagram showing the hardware configuration of the document processing system according to this embodiment. In FIG. 2, the host computer 100 comprises a CPU 201 which executes a process for a document containing figures, images, characters, tables (including spreadsheets and the like), and the like on the basis of a document processing program or the like stored in a program ROM within a ROM 203 or an external memory 211. The CPU 201 comprehensively controls devices connected to a system bus 204. The program ROM within the ROM 203 or the external memory 211 stores, e.g., an operating system program serving as the control program of the CPU 201. A font ROM within the ROM 203 or the external memory 211 stores, e.g., font data used in the document process. A data ROM within the ROM 203 or the external memory 211 stores various data used in the document process or the like. The RAM 202 functions as a main memory, work area, or the like for the CPU 201.

A keyboard controller (KBC) 205 controls a key input from a keyboard 209 or a pointing device (not shown). A CRT controller (CRTC) 206 controls the display of a CRT display (CRT) 210. A disk controller (DKC) 207 controls access to the external memory 211 such as a hard disk (HD) or flexible disk (FD) which stores a boot program, various applications, font data, user files, edited files, a printer control command generation program (to be referred to as a printer driver hereinafter), and the like. A printer controller (PRTC) 208 is connected to the printer 107 via a bidirectional interface (interface) 21, and executes a communication control process with the printer 107. An NC 212 is connected to a network, and executes a communication control process with another device connected to the network.

The CPU 201 executes, e.g., an outline font rasterization process to a display information RAM set in the RAM 202, and enables WYSIWYG on the CRT 210. The CPU 201 opens various registered windows and executes various data processes on the basis of commands designated on the CRT 210 with a mouse cursor (not shown) or the like. When the user executes printing, he/she opens a print setting window, and can perform setting of a printer and setting of a printing process method to the printer driver that includes selection of a print mode.

The printer 107 is controlled by a CPU 312. The printer CPU 312 outputs an image signal as output information to a printing unit (printer engine) 317 connected to a system bus 315 on the basis of a control program stored in a program ROM within a ROM 313 or a control program stored in an external memory 314. The program ROM within the ROM 313 stores, e.g., the control program of the CPU 312. A font ROM within the ROM 313 stores, e.g., font data used to generate the output information. A data ROM within the ROM 313 stores, e.g., information used in the host computer for a printer having no external memory 314 such as a hard disk.

The CPU 312 can communicate with the host computer via an input unit 318, and notify the host computer 100 of internal printer information or the like. A RAM 319 functions as a main memory, work area, or the like for the CPU 312, and the memory capacity can be expanded by an optional RAM connected to an expansion port (not shown). The RAM 319 is used as an output information mapping area, environment data storage area, NVRAM, or the like. Access to the external memory 314 such as a hard disk (HD) or IC card is controlled by a memory controller (MC) 320. The external memory 314 is connected as an option, and stores font data, emulation programs, form data, and the like. Reference numeral 321 denotes an operation panel having operation switches, an LED display, and the like.

The number of external memories 314 is not limited to one, and a plurality of external memories 314 may be arranged. A plurality of external memories which store an option card and a program for interpreting the printer control languages of different language systems in addition to built-in fonts may be connected. Further, an NVRAM (not shown) may be adopted to store printer mode setting information from the operation unit 321.

<Example of Format of Electronic Document Data>

Before referring to details of the bookbinding application 104, the data format of a book file will be explained. The book file has a three-layered structure similar to a paper-medium book. The upper layer is called a "book", resembles one book, and defines the attributes of the entire book. The intermediate layer corresponds to a chapter in the book, and is also called a "chapter". As for each chapter, its attributes can be defined. The lower layer is a "page", and corresponds to each page defined by an application program. As for each page, its attributes can be defined. One book may contain a plurality of chapters, and one chapter may contain a plurality of pages.

Figure 3:
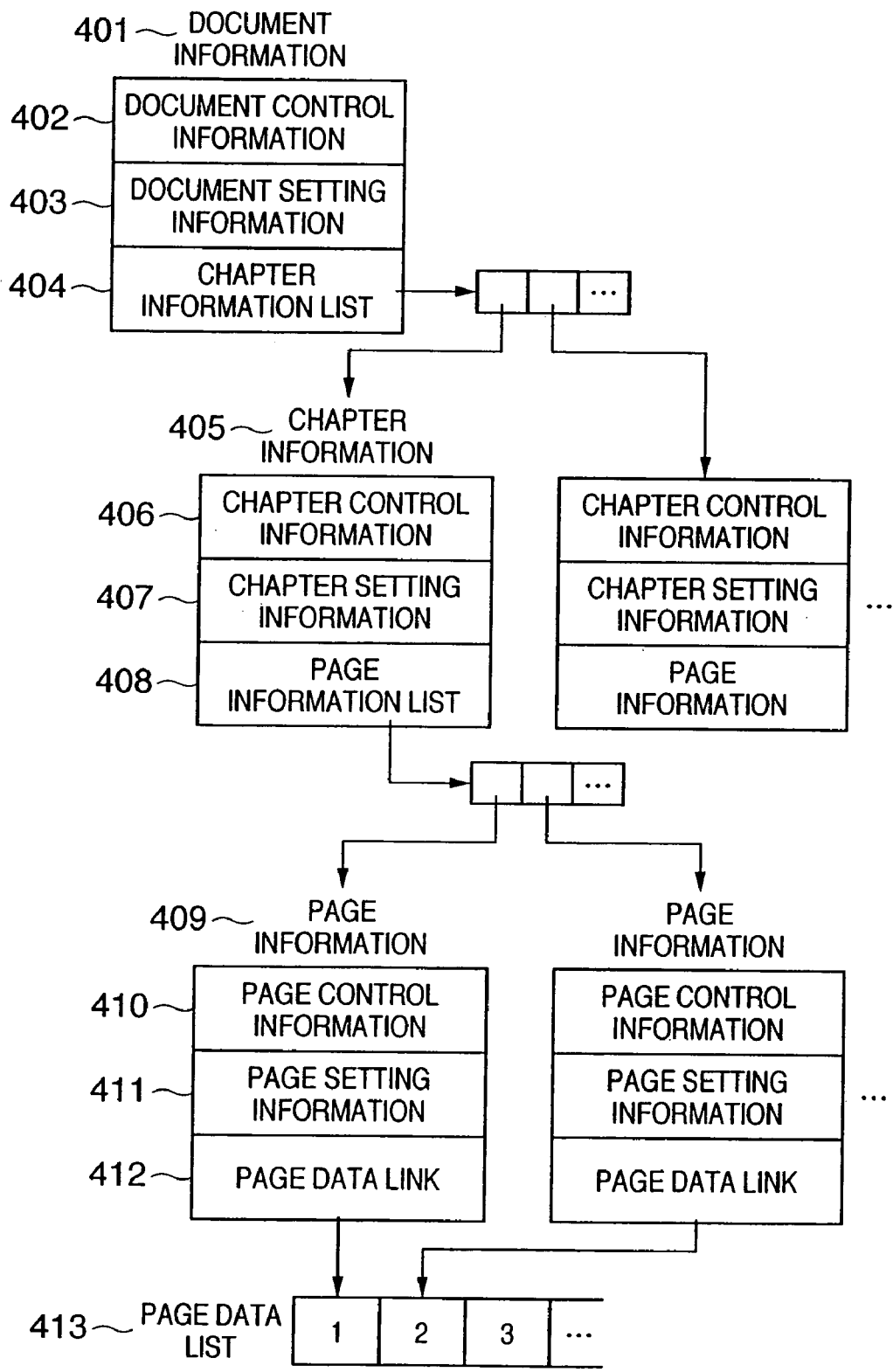
FIG. 3 is a block diagram showing an example of a book file structure.

FIG. 3 is a block diagram schematically showing an example of the book file format. The book file is saved in a memory or hard disk in a format shown in FIG. 3. A book, chapter, and page in the book file in this example are represented by corresponding nodes. One book file contains one book. The book and chapter are a concept for defining a book structure, and contain, as entities, defined attribute values and links to lower layers. The page has, as entities, data of each page output from an application program. The page contains an original page entity (original page data) and a link to each original page data in addition to an attribute value. Note that a print page to be output to a paper medium may contain a plurality of original pages. This structure is displayed not by a link, but by attributes in book, chapter, and page layers.

In FIG. 3, a book file need not be one completed book, and "book" is generalized as "document". Document information 401 is defined at the top. The document information 401 can be roughly divided into three parts 402 to 404. The document control information 402 holds information such as the path name in the file system of a document file. The document setting information 403 holds layout information such as the page layout, and function setting information of a printing apparatus such as stapling, and corresponds to book attributes. The chapter information list 404 holds as a list a set of chapters which form a document. The list holds chapter information 405.

The chapter information 405 can also be roughly divided into three parts 406 to 408. The chapter control information 406 holds information such as the chapter name. The chapter setting information 407 holds information on the page layout and stapling unique to the chapter, and corresponds to chapter attributes. By holding setting information for each chapter, a document having a complicated layout can be created so that the first chapter has a 2-up layout and the remaining chapters have a 4-up layout. The page information list 408 holds as a list a set of original pages which form each chapter. The page information list 408 designates page information data 409.

The page information data 409 can also be roughly divided into three parts 410 to 412. The page control information 410 holds information such as a page number displayed at the tree. Page setting information 411 holds information such as the page rotation angle and page layout position information, and corresponds to original page attributes. The page link information 412 is document data corresponding to a page. In this example, the page information 409 does not directly have document data, but has only the link information 412. Actual document data is held by a page data list 413.

FIGS. 4A and 4B show a list representing an example of the book attribute (document setting information 403). In general, as for an item which can be defined repetitively on a lower layer, the attribute value of the lower layer is preferentially adopted. As for an item contained in only the book attribute, a value defined in the book attribute is effective throughout the book. An item repetitively defined on a lower layer is a default value used when this item is not defined in the lower layer. In this example, however, whether to preferentially adopt the attribute value of a lower layer can be selected (to be described later). Each item shown in FIGS. 4A and 4B does not correspond to one concrete item, but may contain a plurality of relevant items.

Items unique to the book attribute are six items: printing method, details of bookbinding, front/back cover, index sheet, slip sheet, and chaptering. These items are defined throughout the book. As the printing method attribute, three values, i.e., single sided printing, double sided printing, and bookbinding printing can be designated. Bookbinding printing is a method of printing in a format which allows bookbinding by bundling a separately designated number of paper sheets, folding the bundle into two, and binding the bundle. As the detailed bookbinding attribute, the opening direction and the number of paper sheets to be bundled can be designated when bookbinding printing is designated.

The front/back cover attribute includes designation of adding paper sheets serving as front and back covers when an electronic document file combined as a book is printed, and designation of contents to be printed on the added paper sheets. The index sheet attribute includes designation of inserting a tabbed index sheet separately prepared in a printing apparatus for chaptering, and designation of contents to be printed on the index (tabbed) portion. This attribute becomes effective when a printing apparatus for use is equipped with an inserter having an inserting function of inserting a paper sheet prepared separately from a print sheet into a desired position, or when a plurality of sheet cassettes can be used. This also applies to the slip sheet attribute.

The slip sheet attribute includes designation of inserting a paper sheet fed from an inserter or sheet feed cassette for chaptering, and designation of a sheet feed source when a slip sheet is inserted.

The chaptering attribute includes designation of whether to use a new paper sheet, use a new print page, or do nothing particular at a chapter break. In single sided printing, the use of a new paper sheet and the use of a new print page are the same. In double sided printing, successive chapters are not printed on one paper sheet if "the use of a new paper sheet" is designated, but may be printed on the obverse and reverse of one paper sheet if "the use of a new print page" is designated.

FIG. 5 shows a list representing an example of the chapter attribute (indicating the chapter setting information 407), and FIG. 6 shows a list representing an example of the page attribute (indicating the page setting information 411). The relationship between the chapter attribute and the page attribute is the same as that between the book attribute and the lower layer attribute. As for the chapter attribute, there is no item unique to the chapter, and all items overlap those of the book attribute. In general, if the definition of the chapter attribute is different from that of the book attribute, a value defined by the chapter attribute precedes. In this example, however, whether to preferentially adopt the attribute value of a lower layer can be selected (to be described later).

Items common to only the book and chapter attributes are five items: paper size, paper direction, N-up printing designation, enlargement/reduction, and delivery method. Of these items, the N-up printing designation attribute is an item for designating the number of original pages contained in one print page. Layouts which can be designated are 1×1, 1×2, 2×2, 3×3, 4×4, and the like. The delivery method attribute is an item for designating whether to staple discharged paper sheets. The effectiveness of this attribute depends on whether a printing apparatus for use has a stapling function.

Items unique to the page attribute are a page rotation attribute, zoom, layout designation, annotation, page separation, and operation instruction comment 601. The page rotation attribute is an item for designating the rotation angle when an original page is laid out on a print page. The zoom attribute is an item for designating the zoom ratio of an original page. The zoom ratio is designated based on a virtual logical page region size=100%. The virtual logical page region is a region occupied by one original page when original pages are laid out in accordance with N-up designation or the like. For example, the virtual logical page region is a region corresponding to one print page for 1×1, and a region obtained by reducing each side of one print page to about 70% for 1×2. The operation instruction comment is an item for appending a comment including a proofreading instruction. A plurality of operation instruction comments 601 can be held as page attributes. Information shown in FIG. 20 is held in one operation instruction comment 601.

Attributes common to the book, chapter, and page are a watermark attribute and header/footer attribute. The watermark is a separately designated image or character string printed over data created by an application. The header/footer is a watermark printed at the upper or lower margin of each page. For the header/footer, items such as a page number, and time and date which can be designated by variables are prepared. Contents which can be designated by the watermark attribute and header/footer attribute are common between the chapter and the page, but are different from those of the book. The book can set the watermark and header/footer contents, and designate how to print a watermark or header/footer throughout the book. To the contrary, the chapter and page can only designate whether to print a watermark or header/footer set by the book on the chapter or page.

(Operation Instruction Comment (FIG. 20))

An example of the contents of the operation instruction comment 601 shown in FIG. 20 will be explained below. The operation instruction comment 601 has five fields. An operation target 2001 indicates a page, chapter, or document as a target of an operation instruction. For example, a category such as a page or chapter is indicated by a specific code, e.g., "D" for an entire document, "C" for a chapter, or "P" for a page. Since the operation instruction target comment is part of page setting information (i.e., page attributes), a page number or chapter number as an operation target represents a page or chapter including the operation instruction comment.

An operation item 2002 is information indicating the contents of an operation. For example, the operation item 2002 includes information indicating editing operations such as deletion of a page or chapter, movement of a page or chapter, chapter division, replication of a page or chapter, change of a page name or chapter name, insertion of a slip sheet or index sheet, page layout, addition of an annotation, addition of a header/footer, and print position adjustment for each page. The operation item 2002 also adopts code information uniquely indicating each editing operation. If an operation requires a parameter, the operation item 2002 also includes, e.g., a parameter separated by a separator. In the above example, information indicating a movement destination is input as a parameter for movement of a page or chapter, information indicating the contents of an annotation to be added is input as a parameter for addition of an annotation, and information indicating the adjustment amount of a print position or the adjusted position is input as a parameter for print position adjustment for each page. These parameters are saved as part of the operation item 2002.

Figure 21:
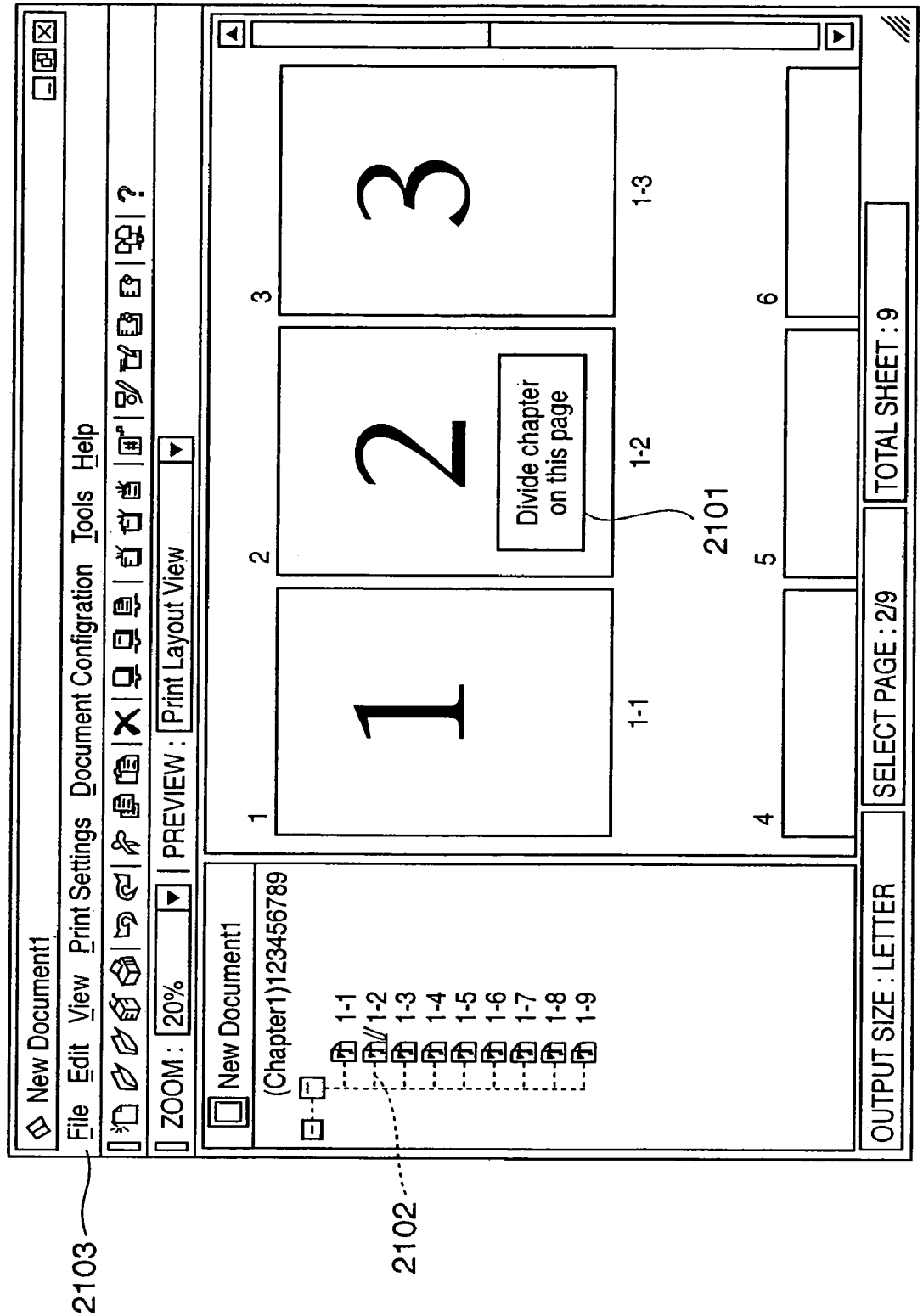
FIG. 21 is a view showing an example of a user interface window displayed when an electronic document file for which an operation instruction comment is set is opened.

A text comment 2003 is information such as a character string input by the operator who inputs the operation instruction comment. As shown in FIG. 21, in preview display or tree display of a user interface window provided by the document processing system according to this embodiment, the contents of the text comment 2003 are overlaid on the image of a page corresponding to page setting information including the operation instruction comment 601. A character decoration designation 2004 defines a color and decoration in display of the text comment 2003. A marker color designation 2005 designates the transparent color of a color marker to be superimposed on the text comment. The character decoration designation 2004 includes designation of, e.g., the color and size of a character, the font type, a bold character, an underline, italics, and blinking display.

<Example of Operation Sequence of Document Processing System According to Embodiment>

(Example of Book File Generation Sequence)

The book file has the above-described structure and contents. A sequence of creating a book file by the bookbinding application 104 and electronic document writer 102 will be explained. Creation of a book file is realized as part of book file editing operation by the bookbinding application 104.

Figure 7:
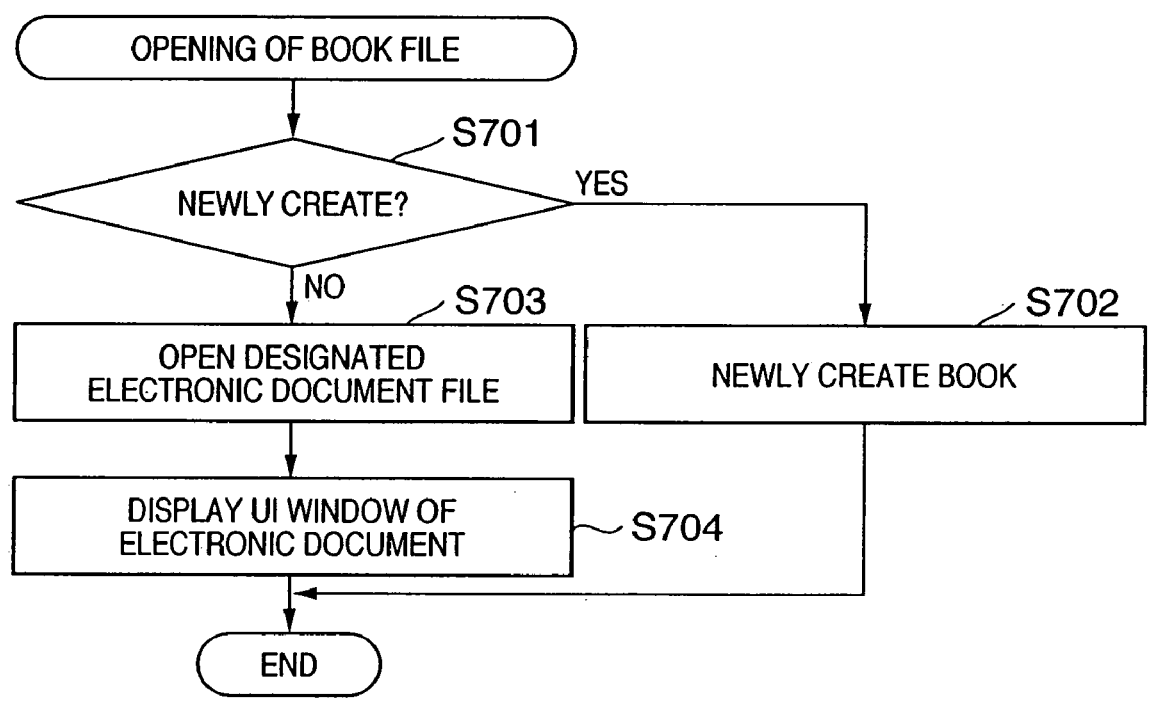
FIG. 7 is a flowchart showing an example of a sequence of opening a book file.
Figure 8:
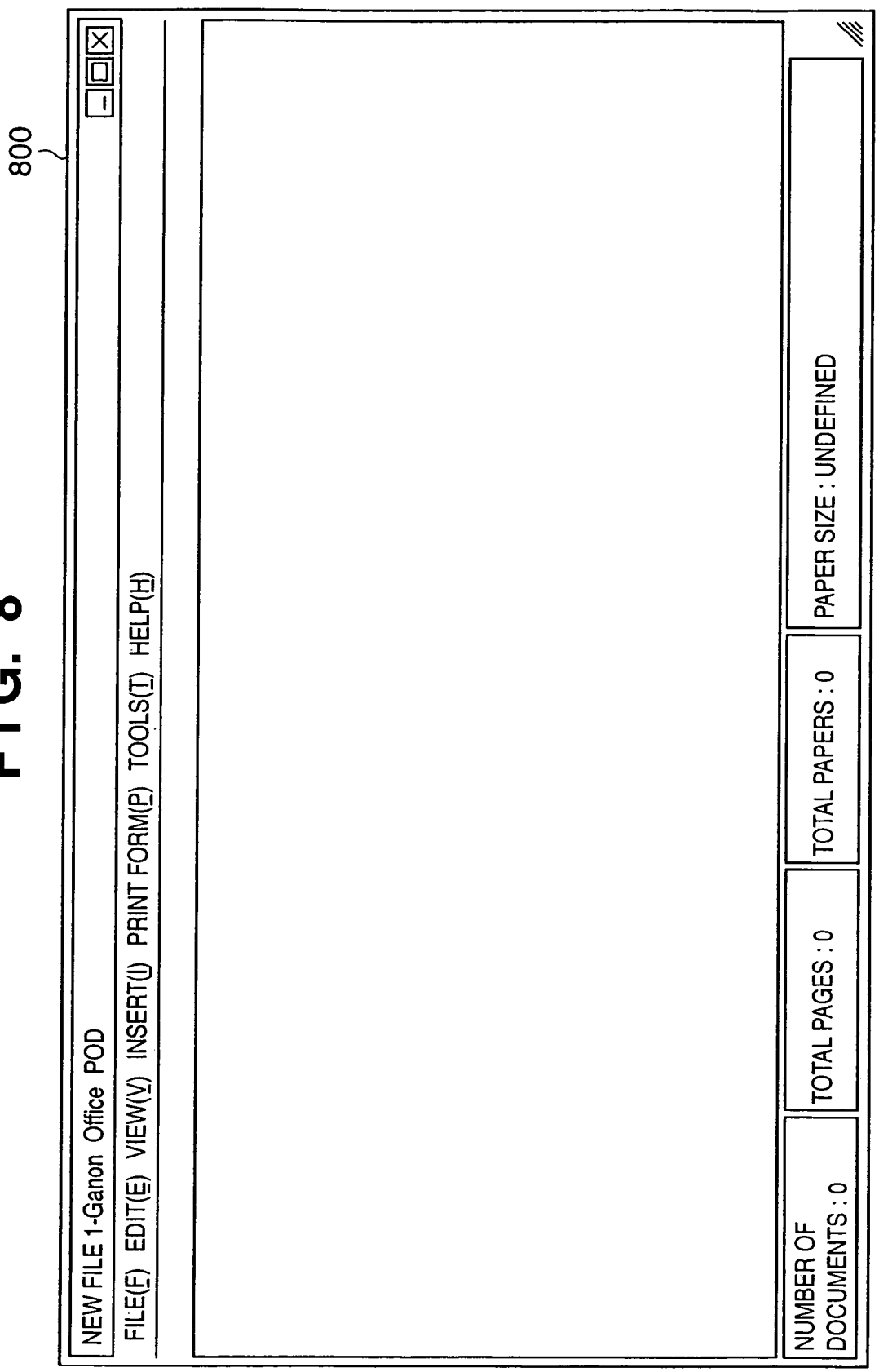
FIG. 8 is a view showing an example of a user interface window when a new book file is opened.

FIG. 7 is a flowchart showing a sequence when the bookbinding application 104 opens a book file. Whether a book file to be opened is one to be newly created or an existing one is determined (step S701). If the book file is one to be newly created, a book file containing no chapter is newly created (step S702). In the example shown in FIG. 3, the newly created book file has only a book node 301 which does not have any link to a chapter node. Applied book attributes are a set of attributes which are prepared in advance for creation of a new file. A UI (User Interface) window for editing the new book file is displayed (step S704). FIG. 8 shows an example of a UI window when a book file is newly created. In this case, the book file does not have any substantial content, and a UI window 800 does not display anything.

Figure 9:
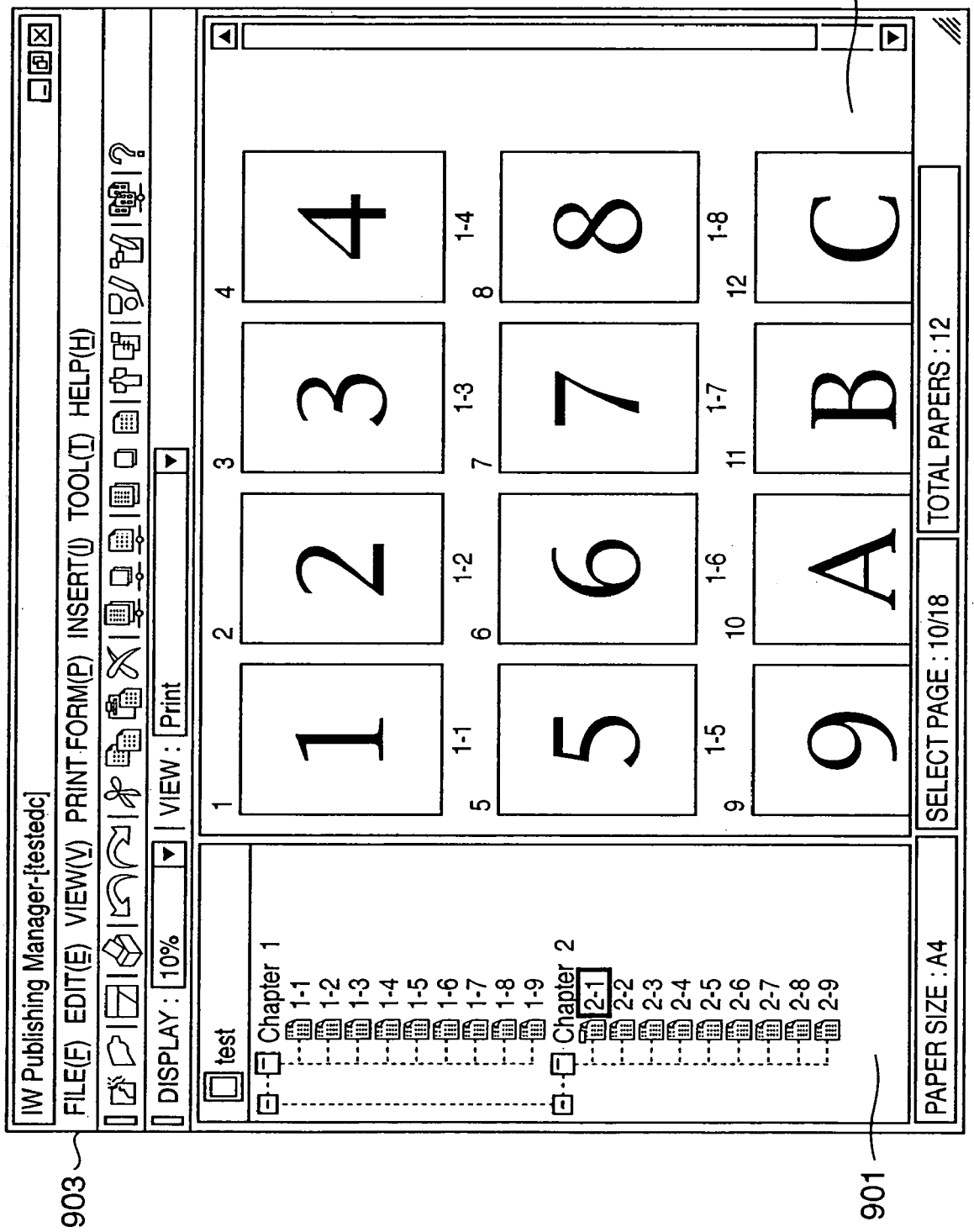
FIG. 9 is a view showing an example of a user interface window when an existing book file is opened.

If the book file is an existing one, a designated book file is opened (step S703), and a UI (User Interface) window is displayed in accordance with the structure, attributes, and contents of the book file. FIG. 9 is a view showing an example of the UI window. A UI window 900 has a tree portion 901 representing a book structure, and a preview portion 902 displaying a state to be printed. The tree portion 901 displays chapters contained in the book and pages contained in each chapter so as to present a tree structure as shown in FIG. 3. Pages displayed at the tree portion 901 are original pages. The preview portion 902 displays reduced print page contents. The display order reflects the book structure.

Application data converted into an electronic document file by the electronic document writer 102 can be added as a new chapter to the open book file. This function is called an electronic document import function. The electronic document is imported to the book file newly created by the sequence of FIG. 7, giving an entity to the book file. This function is activated by dragging and dropping application data in the window of FIG. 8 or 9.

Figure 10:
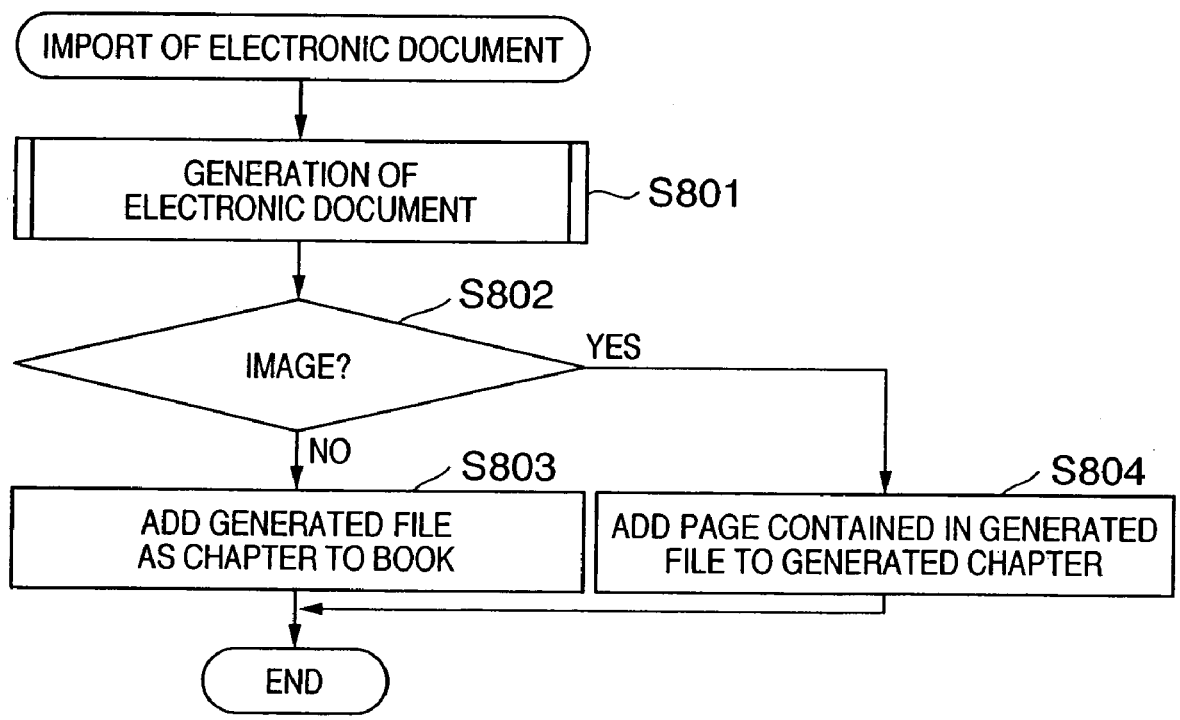
FIG. 10 is a flowchart showing an example of a sequence of importing an electronic document file to a book file.

FIG. 10 is a flowchart showing an example of an electronic document import sequence. An application program which has generated designated application data is activated. The electronic document writer 102 is designated as a device driver, and application data is printed out to convert the data into electronic document data (step S801). After conversion, whether the converted data is image data is determined (step S802). This determination can be done on the basis of the file extension of application data under the Windows® OS. For example, an extension "bmp" represents Windows® bitmap data; "jpg", jpeg-compressed image data; and "tiff", tiff-format image data. Such image data can directly generate an electronic document file without activating any application, unlike S801, and thus the process in S801 can be omitted.

If the data is not image data, the electronic document file generated in step S801 is added as a new chapter to the book of a currently open book file (step S803). As for chapter attributes which are common to book attributes, the values of the book attributes are generally copied. As for unique chapter attributes, predetermined default values are set. In this example, whether to preferentially adopt the attribute value of a lower layer can be selected (to be described later).

If the data is image data, no new chapter is added in principle, and each original page contained in the electronic document file generated in step S801 is added to a designated chapter (step S804). If the book file is a newly created one, a new chapter is created, and each page of the electronic document file is added as a page belonging to the chapter. As for page attributes, attributes common to the attributes of an upper layer are generally given the attribute values of the upper layer, and attributes which are defined in application data and inherited to an electronic document file are given values defined in the application data. For example, when N-up designation is defined in application data, the page inherits this attribute value. In this way, a new book file is created, or a new chapter is added. In this example, however, whether to preferentially adopt the attribute value of a lower layer can be selected (to be described later).

Figure 11:
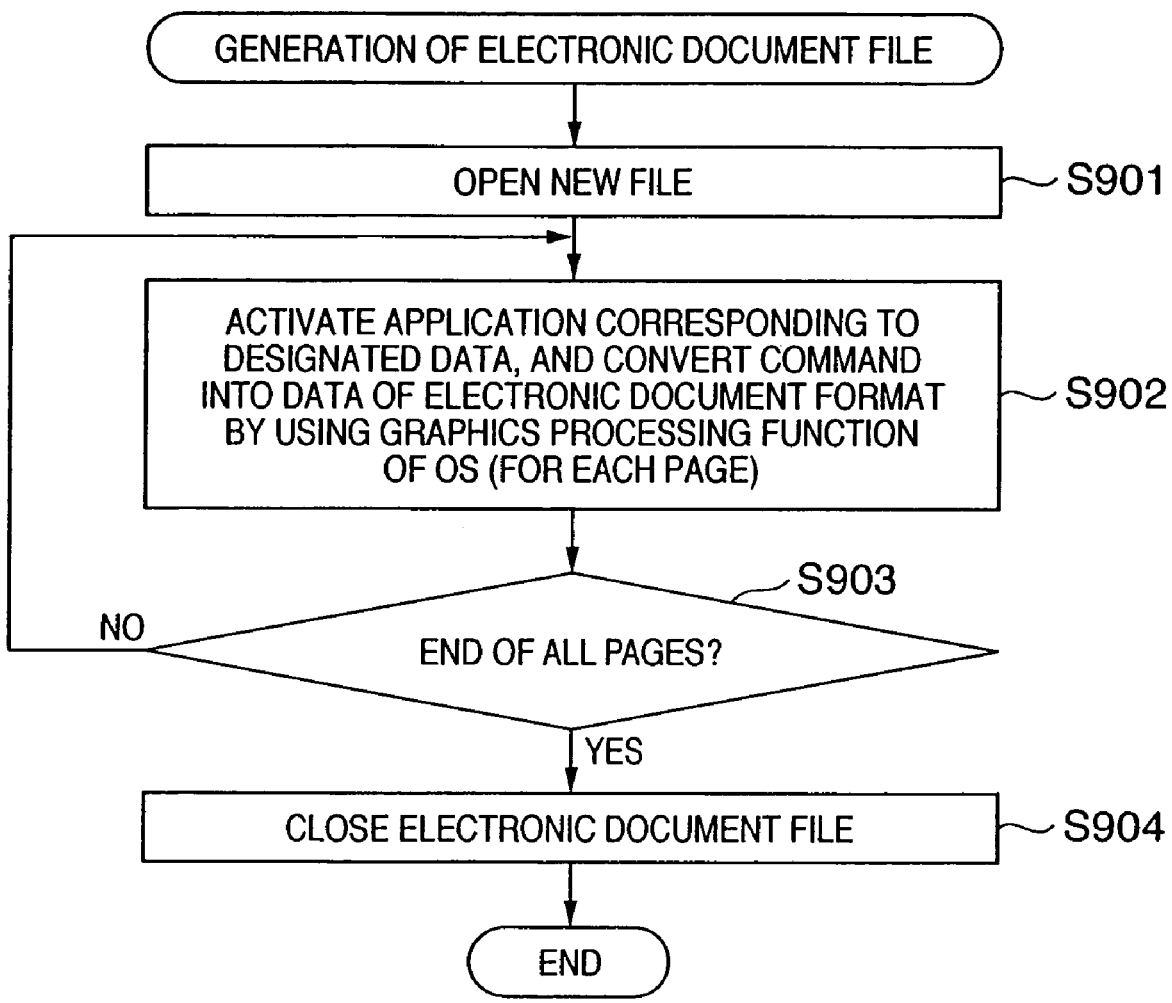
FIG. 11 is a flowchart showing an example of a sequence of converting application data into an electronic document file in step S801 of FIG. 10.

FIG. 11 is a flowchart showing a sequence of generating an electronic document file by the electronic document writer 102 in step S801 of FIG. 10. A new electronic document file is created and opened (step S901). An application corresponding to designated application data is activated. The electronic document writer 102 is set as a device driver to transmit an output command to an OS output module. The output module converts the received output command into data of an electronic document format by the electronic document writer, and outputs the converted data (step S902). The output destination is the electronic document file opened in step S901. Whether all designated data have been converted is determined (step S903), and if YES in step S903, the electronic document file is closed (step S904). The electronic document file generated by the electronic document writer 102 is a file containing original page data entities shown in FIG. 3.

(Example of Editing Book File)

As described above, a book file can be created from application data. Chapters and pages in the generated book file can be edited as follows.

(1) New document
(2) Delete
(3) Copy
(4) Cut
(5) Paste
(6) Move
(7) Change chapter name
(8) Reassign page number/name
(9) Insert cover
(10) Insert slip sheet
(11) Insert index sheet
(12) Page layout of each original page
(13) Divide into plurality of chapters
(14) Add annotation
(15) Add header/footer/page number
(16) Adjust print position In addition, an operation of canceling executed editing operation, and an operation of restoring canceled operation can be performed. These editing functions enable editing operations such as consolidation of a plurality of editing information files, rearrangement of chapters and pages within a book file, delete of chapters and pages within a book file, layout change of an original page, and insertion of a slip sheet and index sheet. By these operations, operation results are reflected in attributes shown in FIGS. 4 to 6 or in the structures of the book file. For example, a blank page is inserted to a designated portion by an operation of newly adding a blank page. The blank page is processed as an original page. If the layout of an original page is changed, the change contents are reflected in attributes such as the printing method, N-up printing, front/back cover, index sheet, slip sheet, and chaptering.

Editing operation items for a chapter or page of a book file can be created as an operation instruction comment and appended to a page as part of page setting information. Display and operation examples in editing will be described in detail below.

<Example of Preview Display Contents>

When a book file is opened by the bookbinding application in a document view mode (to be described later), the book file is read out. Then, page images created from corresponding page data are laid out in a page frame in accordance with a layout designated by the chapter attribute and book attribute while referring to document setting information, chapter setting information, page setting information, and the like. A preview image is created by arranging the resultant images in the order of chapters and pages, which is determined by the structure of the book file. Moreover, a tree image which visualizes the hierarchical structure of pages, chapters, and books is created. The created preview image and tree image are displayed on the user interface window 900 shown in FIG. 9. In FIG. 9, the tree portion 901 displays a tree representing the structure of the open book (to be referred to as a "book of interest" hereinafter). At the preview portion, three display methods including the document view mode are prepared in accordance with designation by the user. The first method is a mode called a document view which directly displays original pages. In the document view mode, the contents of original pages belonging to the book of interest are reduced and displayed. The display of the preview portion does not reflect any layout. The second method is a printing view mode. In the printing view mode, the preview portion 902 displays original pages in a format which reflects the layout of them. The third method is a simple printing view mode. In the simple printing view mode, the contents of original pages are not reflected in the display of the preview portion, but only the layout is reflected.

<Example of Editing Operation of Document Processing System According to Embodiment>

FIG. 9 shows the operation window of the bookbinding application 104. The bookbinding application can set the function of a printing apparatus such as stapling, in addition to editing such as a change of the page order of a document, copying, and delete. The bookbinding application can cause a designated printing apparatus to print. A tree view representing a document structure is displayed in the left region of FIG. 9. A document is formed from a set of chapters, and each chapter is formed from a set of original pages. The print preview of each page is displayed in the right region of FIG. 9.

Editing operations are realized by selecting an operation target from a tree image or preview image by clicking operation using a pointing device, and executing predetermined operations for the operation target. The predetermined operations include selecting an item corresponding to a desired operation from a menu bar 903 and manipulating an object (icon) indicating a chapter or page in the tree image or preview image. In, e.g., deletion operation, "delete" in the menu is selected for the page or chapter selected from the preview image or tree image. Alternatively, the page or chapter is dragged onto an icon indicating deletion. In movement operation, "move" in the menu or a movement destination is selected for a page or chapter selected for the page or chapter selected from the preview image or tree image. Alternatively, the page or chapter is dragged onto the position of the movement destination. In chapter division, "divide" in the menu is selected after chapter selection.

In actual (real-time) editing operation, the configuration and attribute of a book file are changed in accordance with the above-described editing operations, and the tree image or preview image of the changed book file is displayed again. To, e.g., move a page or chapter, the target page or target chapter in the book file is searched for by referring to target specific information for specifying the target page or target chapter. Link information corresponding to the found target page (indicating a link to individual page information contained in the page information list) is inserted from the page information list 408 of the chapter information 405 to which the target page belongs to the page information list 408 of a chapter at a movement destination. Link information of the original page information list is deleted. Alternatively, link information corresponding to the chapter (indicating a link to individual chapter information contained in the chapter information list) is inserted from the chapter information list 404 of the document information 401 to the chapter information list 408 at a movement destination. Link information of the original chapter information list is deleted. If the chapter before movement is identical to a chapter after movement, the order of the link to the page information in the page information list is changed. To delete a page or chapter, the link to the page information or chapter information to be deleted which is specified by referring to the target specific information is deleted from the page information list in the chapter information or the chapter information list in the document information. The target specific information only needs to contain, e.g., a chapter number for a chapter, or a chapter number and page number for a page. The chapter and page numbers are defined in accordance with the layout order in the chapter information list and page information list. When a chapter or page number is saved as target specific information, the number and a page or chapter as an entity can readily be made to correspond to each other based on the structure of the book file.

The editing operations also include a setting change in which only the setting values of the document setting information 403, chapter setting information 407, or page setting information 411 are changed without reflecting in the structure of the book file, like layout designation (Nin1 designation) or slip sheet insertion. In these editing operations, a process of updating corresponding setting values in a chapter or page specified by target specific information is executed. The bookbinding application 104 executes a process corresponding to the above-mentioned editing operations.

<Editing of Operation Instruction Comment>

A process to be executed when the user transmits a thus generated electronic document to the proofreader, and the proofreader proofreads the received electronic document. The proofreader (operator) uses the same user interface of the bookbinding application 104 as that for the creator (user). The proofreader can create the above-described operation instruction comment at an arbitrary position on a print preview for each page on the right side of FIG. 9. FIG. 21 shows a display example in which an operation instruction comment is created on the second page of the preview portion 902. In FIG. 21, a text comment 2101 included in the operation instruction comment is superimposed on the page as the target of operation instruction comment creation (the second page in the first chapter in FIG. 21) by the bookbinding application 104. Each operation instruction comment is input through an operation instruction comment setting UI 2201 shown in FIG. 22, which is displayed by, e.g., selecting an "operation instruction comment" from a menu bar 2103 shown in FIG. 21. When the operation instruction comment is input through the operation instruction comment setting UI, the operation target is also input. In the operation instruction comment setting UI 2201, a page or chapter as an operation target is designated from a designation field 2202. As the operation target, a number 2202a of a chapter or page is designated in addition to the choice of a document, chapter, or page. The operation target 2202 and the number 2202a correspond to the operation target 2001. At this time, when a chapter or page is selected in the preview portion 902 or tree portion 901 of the bookbinding application, "chapter" or "page" is input to the operation target field 2202. The number of the selected chapter or page is temporarily saved as an input to the number designation field 2202a. When the saved number is displayed, the proofreader can omit input to the operation target field. Then, an operation item 2203 for the operation target is designated from an operation item list. The operation items 1 to 16 enumerated in (Example of Editing Book File) described above are listed in the operation item field 2203, and can be selected and designated. Some operations included in the operation items need to designate the location after the operation. For example, if the operation item "Move" is designated, an item 2204 for designating where to move is also set. Furthermore, the display contents of an operation instruction comment can be input as a text comment (to be also referred to a proofreading comment) 2205.

When the "colors and lines setting" tab shown in FIG. 22 is selected, the background color, foreground color, linetype, and the like in displaying the text comment can be selected. When the "text setting" tab is selected, the font type in displaying the text comment can be selected. The selected linetype, font type, color, and the like are saved as the text decoration designation 2004, and the selected background color and the like are saved as the marker color designation 2005.

When the OK button shown in FIG. 22 is pressed, the values which are input via the user interface and temporarily saved in correspondence with the items of the operation instruction comment as described above are saved in the format of the operation instruction comment shown in FIG. 20 as part of the page setting information (operation instruction comment 601) of the page input as the operation target. When a chapter or document is set as the operation target, the input operation instruction comment may be saved as page setting information of, e.g., the first page of the chapter or document.

Figure 23:
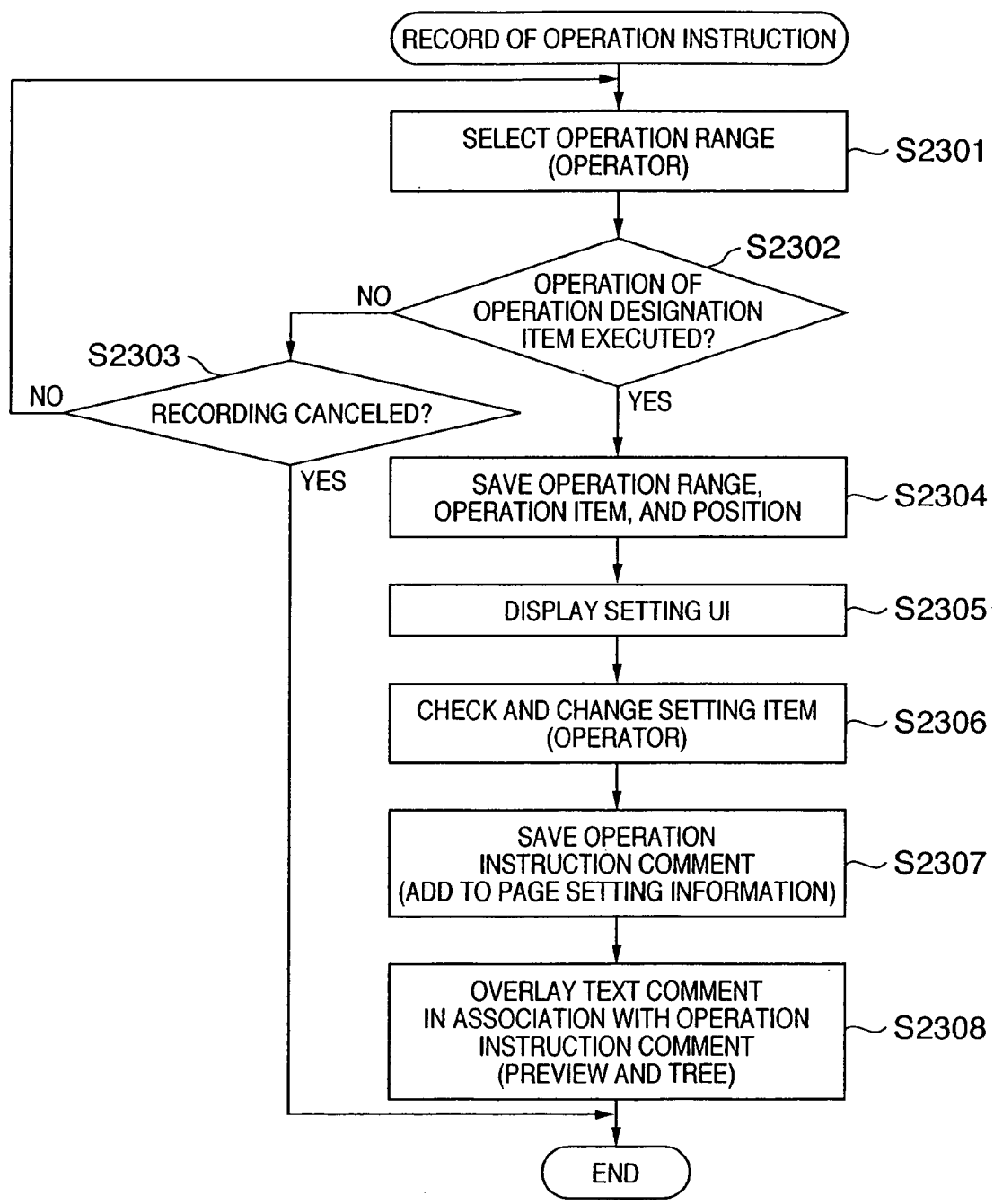
FIG. 23 is a flowchart showing an example of an operation instruction comment designation method.

Instead of or in addition to input through the user interface, an operation sequence executed by the proofreader (the proofreader may be the user) can be recorded to create an operation instruction comment. FIG. 23 is a flowchart showing a process in such a proofreader operation. When the proofreader designates recording of operation instructions through, e.g., the user interface window shown in FIG. 9, recording starts based on the sequence shown in FIG. 23. Assume that the proofreader selects a page or chapter as an operation range through, e.g., the user interface window shown in FIG. 9. In this case, information indicating a document, chapter, or page as the selection target, and a number (or range) for specifying the target if the selection target is a chapter or page are temporarily saved as operation target information (S2301). If execution of the operation item as the target is designated (YES in step S2303), operation item information is saved in addition to the operation target information (S2304). As the operation item information, for example, a code corresponding to the designated operation is saved. In actual editing operation, an editing process corresponding to the operation is executed. To the contrary, in the operation instruction recording process, a process of saving a code corresponding to the operation and, if necessary, a parameter such as a movement destination is executed in practice, instead of applying the operation. This parameter is saved as part of the operation items.

After that, the operation instruction comment setting UI shown in FIG. 22 is displayed while an operation target is being selected (S2305). In the displayed UI, a comment (text) corresponding to the already selected operation contents is automatically input as the contents of the text comment 2205. The comment corresponding to the operation contents can uniquely be determined from the code and parameter of the operation target and the operation item. This comment is generated by generating a text "execute "operation item information" for "operation target information" (to "parameter")". For example, as shown in FIG. 22, this comment is "Move chapter 1-2 to chapter 6.". Note that the parentheses are added if the operation item information contains a parameter for, e.g., movement. When the operation target information or operation item information is given by a code meaningless for the operator, the operator appropriately returns the code to a recognizable character string by using a correspondence table. To designate text decoration or marker color, a predetermined value is used.

An execution permission setting (2206) on double click can be added in advance to a thus input operation instruction comment through the operation instruction comment setting UI. The proofreader checks the check box when the proofreading contents are decided. Then, double click on the operation instruction comment displayed while being associated with (in this example, superimposed on) a preview image or tree view image is defined as an instruction to execute the operation. Therefore, when the operation instruction comment is double-clicked, the editing operations included in the operation instruction comment can be executed, thus facilitating the designation operation.

Alternatively, if the rewrite of operation instruction comment settings is inhibited, an execution permission setting by click is also possible.

When the proofreader modifies and saves the contents of the items displayed on the user interface, the operation instruction comment can be set without any specific knowledge. To do this, in step S2306, the proofreader checks the setting contents (S2306). If the OK button is selected, the flow advances to step S2307 to add the input operation target information, operation item information (including a parameter), text comment information, character decoration designation information, and marker color designation information to the page setting information of the target page as an operation instruction comment. Finally, the text comment included in the created operation instruction comment is visualized as a text object and displayed while being associated with (superimposed on) the corresponding page (S2308). In displaying the text comment, the text object to be displayed is associated with a corresponding operation instruction comment by using, e.g., a number. This is because a plurality of operation instruction comments may be added to one page in some cases. For example, the first text object associated with page 2-1 is made to correspond to the first operation instruction comment of page information of page 2-1. When a correspondence table and the like are necessary for associating, they are also temporarily created as needed. Note that not only the text comment on the preview image but also a symbol corresponding to the text comment may be displayed for the corresponding page in the tree image. In the example shown in FIG. 21, a symbol (pen-shaped symbol) representing the operation instruction comment is added to the page 1-2 in tree display. This display can be realized by superimposing the symbol on the icon of the page corresponding to page setting information to which the operation instruction comment is added, as in the preview image.

As a consequence, the operation instruction comment setting is displayed as illustrated by a region 2101. When the user as the creator receives the proofread electronic document (electronic document with an operation instruction comment) from the proofreader, he/she selects the region 2101 on the operation window of the bookbinding application 104 so as to execute operations such as execution, modification, and display position movement. At this time, assume that execution of the operation instruction comment is designated by the user by double clicking the region including a character string representing the operation instruction comment. In this case, the bookbinding application 104 applies, to the electronic document, an editing operation designated by the operation item for the operation target included in the operation instruction comment. A preview image and tree image after application are displayed again. After operation application, the applied operation instruction comment is deleted from the page setting information.

<Sequence of Applying Operation Instruction Comment>

Figure 25:
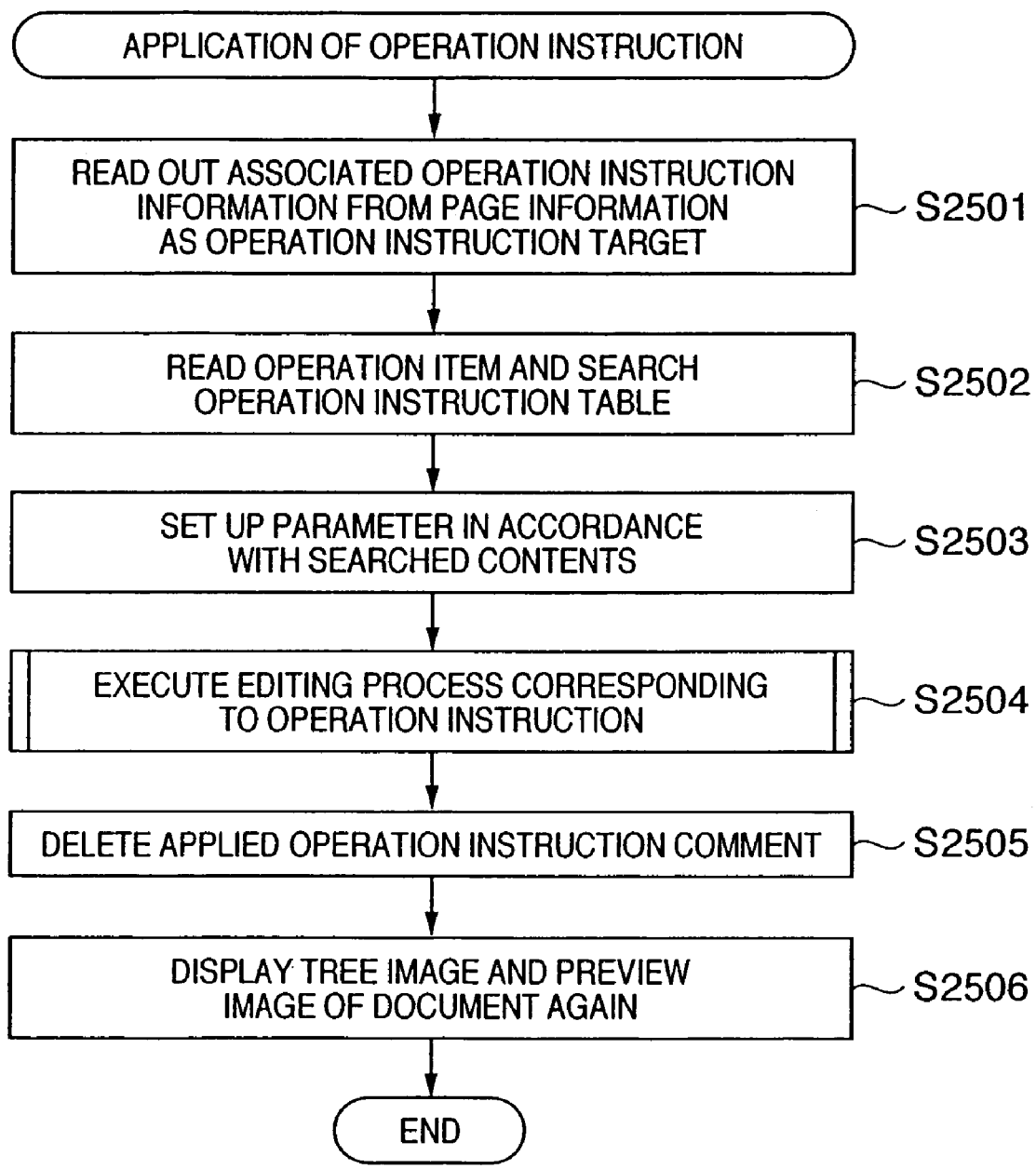
FIG. 25 is a flowchart showing an example of a sequence of applying an operation instruction comment.

FIG. 25 shows a sequence executed by the bookbinding application 104 to apply the operation instruction comment. When an instruction to apply the operation instruction is input by double-clicking the text object 2101, the bookbinding application 104 starts the process shown in FIG. 25 by using the function of the OS. When the text object 2101 is selected by single click, and a property is selected from a pull-down menu displayed by right click, the operation target 2001 and operation item 2002 set in the operation instruction comment 601 of the text object 2101 are displayed. With this operation, the user can recognize the contents of the operation target and operation item set for the text object 2101 in advance before execution. The process in FIG. 25 is the control flow which starts when the text object 2101 is double-clicked.

First, the bookbinding application 104 reads out the operation instruction comment 601, which is designated as an application target, from the page setting information (FIG. 6) associated with it (S2501). Information indicating the double-clicked text object is sent as a parameter. The associated page and operation instruction comment can be specified from the parameter using a correspondence table or the like. If the readout has succeeded, i.e., if the associated page and operation instruction comment have been found, the operation items (operation target 2001 and operation item 2002) are read. An operation instruction table is searched using codes contained in the read operation items (S2502). In the operation instruction table, codes saved in the operation items to indicate the type of editing operation (delete, move, or the like) correspond to the number of necessary parameters, a branch destination as the start of processing to be executed, and the like. If the search has succeeded, i.e., if the code corresponding to the operation item has been registered in the operation instruction table, the bookbinding application 104 sets parameters in number registered in the table in a predetermined parameter region (S2503) and execute a process corresponding to the operation item (S2504). The values of the parameters themselves are saved as part of the setting items.

For example, in a chapter division process, a parameter to be set is a page as a position where a chapter as an operation target is divided. A page corresponding to page setting information to which an operation instruction comment is appended is the first page of the divided chapter. The chapter to be divided is a chapter to which the page setting information having the operation instruction comment belongs. They are saved in a memory as parameters for the chapter division process. Then, the process branches to the chapter division processes illustrated in FIGS. 26A and 26B. For example, in a chapter move process, parameters to be set are a chapter as a movement target and the position of the movement destination, i.e., the chapter immediately before or immediately after the moved chapter. The movement target is a chapter to which a page having an operation instruction comment belongs. The position of the movement destination is saved as part of the operation items. They are newly saved as parameters for the chapter move process. If the process is the chapter division process or chapter move process, it branches in the process illustrated in FIG. 26A.

Figure 26A:
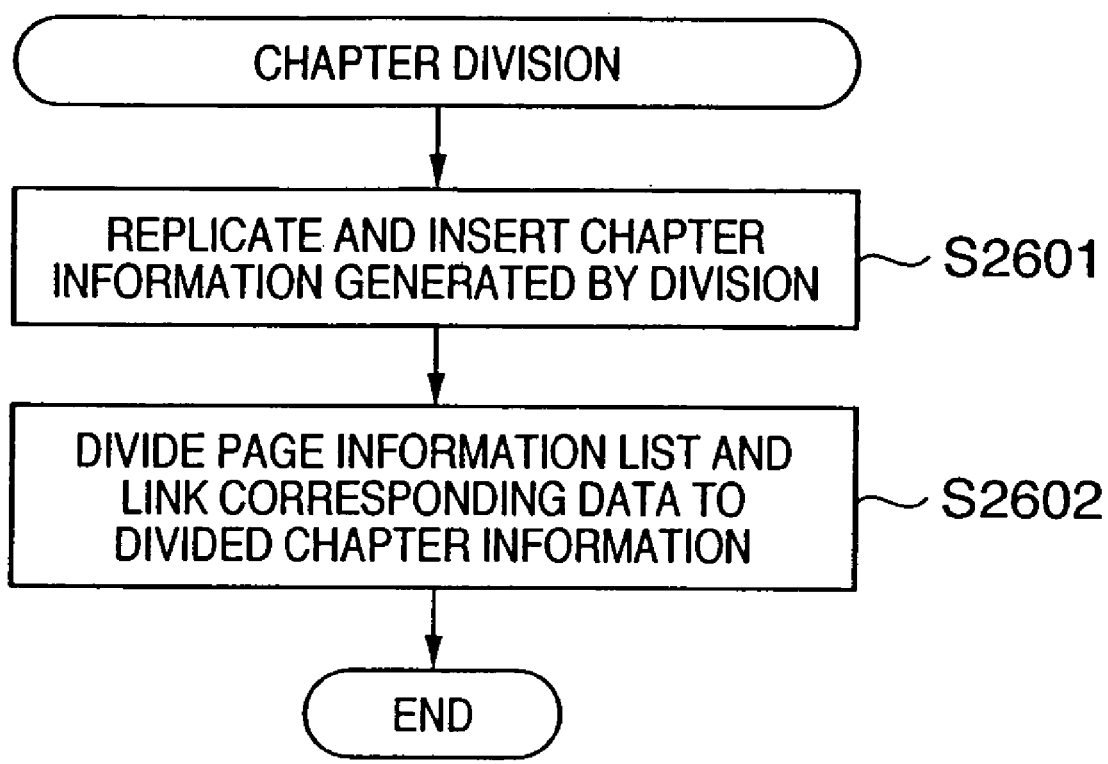
FIGS. 26A and 26B are flowcharts showing an example of a sequence of a chapter move process and chapter division process.
Figure 26B:
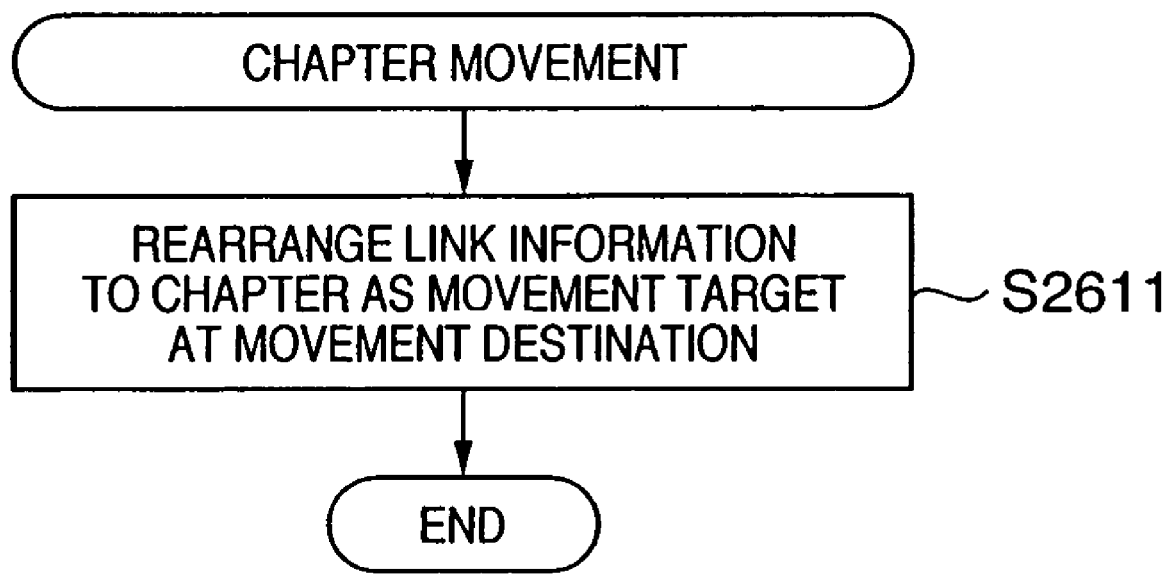

FIGS. 26A and 26B are flowcharts respectively showing a sequence of the chapter division process and chapter move process as concrete examples of the editing operations. Since the processes themselves are thoroughly the same as the real-time editing operations, this sequence is executed even if the real-time editing operations are executed instead of applying the operation instructions. First, chapter information of a chapter as an operation target is copied, and link information to the copied chapter information is inserted into the chapter information list of document information (S2601). The insertion position may be, e.g., immediately after the chapter as the operation target. At this time, the page information list is not copied. Next, the bookbinding application 104 divides the page information list of the chapter as the operation target immediately before the page of the division position. The bookbinding application 104 links a portion after the division position (i.e., the portion not linked to the page information list) to the page information list of the chapter information copied in step S2601 (S2602). In the chapter move process, link information to the chapter as the operation target is extracted from the chapter information list and moved to the position after movement to rearrange it (S2611 in FIG. 26B).

When the process is completed for each operation item, the applied operation instruction comment is deleted from the page setting information (S2505). Finally, the tree image and preview image of the edited document are generated and displayed again (S2506). In the image displayed here, the document from which the applied operation comment is deleted is displayed. For this reason, no text object corresponding to the deleted operation instruction comment is displayed.

With the above sequence, the operation instruction comment can be recorded without any influence on the document configuration. The operation instruction comment includes parameters for executing actual editing operations and a text superimposed on the displayed document. Therefore, the contents of the operation instruction can be presented to the operator by the text. In addition, since the editing operations can be applied in correspondence with the parameters, the operator need not execute the operation again in accordance with the text included in the operation instruction comment.

<Example of Attribute Setting of Document Processing System According to Embodiment>

FIG. 14 shows a "Detailed Setting for Document" window 1400 of the bookbinding application 104. This window allows displaying/setting the "document setting information 403". This window is activated from the "Detailed Setting for Document" menu of a Print Form menu in the application operation window of FIG. 9 or a "Detailed Setting for Document" button on the tool bar. The "Detailed Setting for Document" window is a window for setting attributes which influence a whole document. This window is formed from four sheets Page Setup, Decoration, Edit, and Paper Source. FIG. 14 shows a state in which the Page Setup sheet is displayed. In the Page Setup sheet, settings mainly concerning the layout can be done. Settings such as the paper size, direction, and N-page printing can be designated. This window has check box controls 1401 and 1402 for the zoom.

FIG. 15 shows a "Detailed Setting for Chapter" window 1500 of the bookbinding application 104. This window allows displaying/setting the "chapter setting information 407". This window is activated from the "Detailed Setting for Chapter" menu of a Print Form menu in the application operation window of FIG. 9 or a "Detailed Setting for Chapter" button on the tool bar. The "Detailed Setting for Chapter" window is a window for setting attributes unique to a chapter. This window is formed from four sheets Page Setup, Decoration, Edit, and Paper Source. FIG. 15 shows a state in which the Page Setup sheet is displayed. In the Page Setup sheet, settings mainly concerning a layout unique to each chapter can be done. Settings such as the paper size, direction, and N-page printing can be designated. "Follow Book Attribute" check box controls 1501, 1502, and 1503 are arranged for repetitive setting items between "Detailed Setting for Document" and "Detailed Setting for Chapter". For an item group whose check box is checked, the setting values of the document are applied to the chapter. FIG. 16 shows a case wherein the check box is not checked. Settings unique to a chapter can be classified into two types: setting items held by only a chapter, and setting items whose setting values different from those of the document in the upper layer are held in the chapter layer.

FIG. 16 shows a state in which the check box controls 1501 and 1502 of "Detailed Setting for Chapter" in FIG. 15 are not checked. In this case, even if the whole document uses A3 paper, pages which constitute this chapter use A4 paper. As for the layout, even if the document designates 1 page per sheet, the chapter designates a layout of 4 pages per sheet. "MS Arrange" is checked, and the setting values of the document in the upper layer are employed as those of the chapter.

Figure 17:
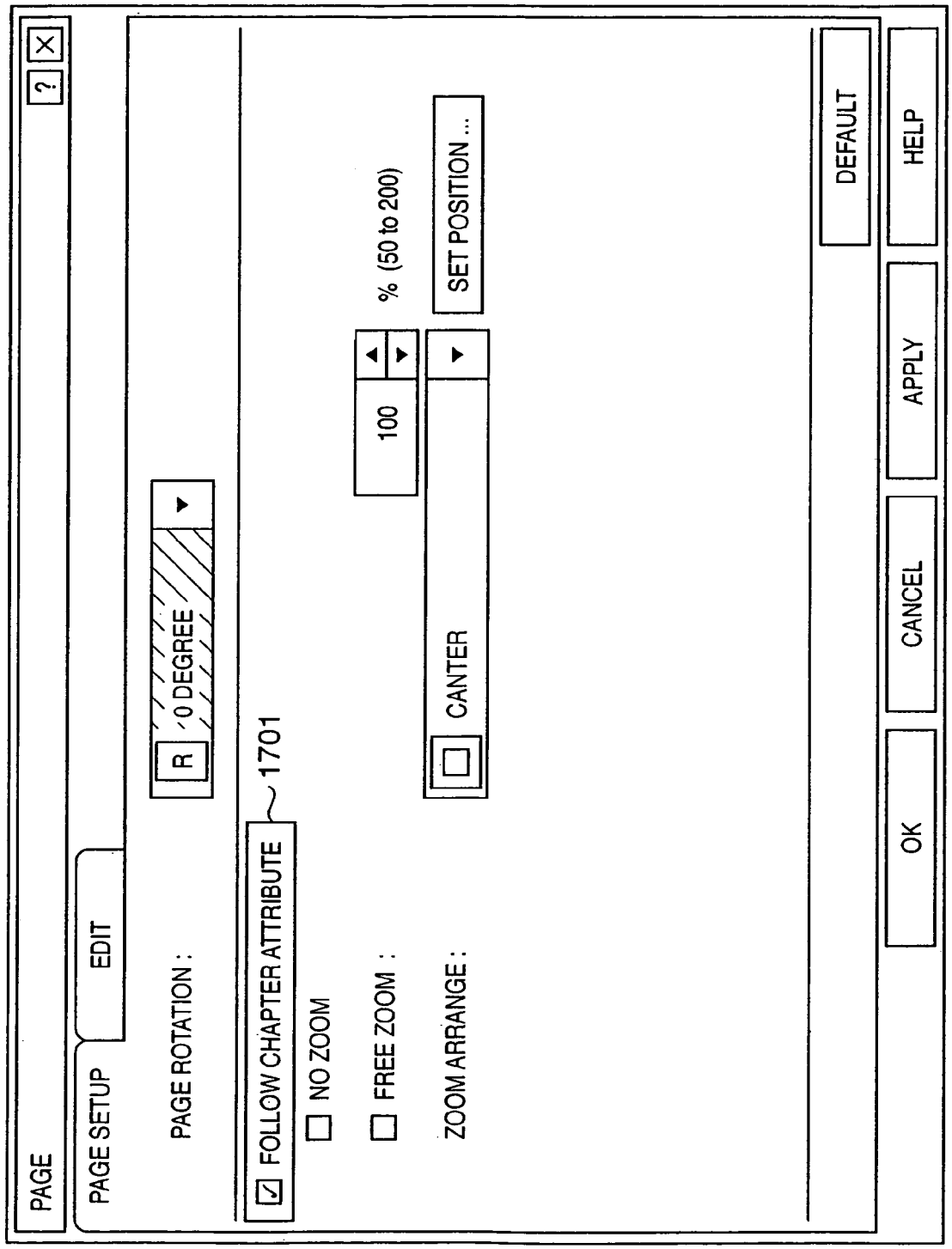
FIG. 17 is a view showing an example of a dialog window for setting a page serving as the lowermost layer of the data structure.

FIG. 17 shows a "Detailed Setting for Page" window 1700 of the bookbinding application 104. This window allows displaying/setting the "page setting information 411". This window is activated from the "Detailed Setting for Page" menu of the Print Form menu in the application operation window of FIG. 9 or a "Detailed Setting for Page" button on the tool bar. The "Detailed Setting for Page" window is a window for setting attributes unique to each page. This window is formed from two sheets Page Setup and Edit. FIG. 17 shows a state in which the Page Setup sheet is displayed. In the page setup sheet, settings mainly concerning a layout unique to each page can be done, and settings such as the rotation angle and enlargement/reduction ratio in laying out an original page can be designated. A "Follow Chapter Attribute" check box control 1701 is arranged for repetitive setting items between "Detailed Setting for Chapter" and "Detailed Setting for Page". For an item whose check box is checked, the setting value of the chapter is applied to the page. FIG. 18 shows a case wherein the check box is not checked.

FIG. 18 shows a state in which Page Rotation setting is changed in "Detailed Setting for Page" of FIG. 17. The control 1701 exhibits a setting of rotating and arranging an original page with the upper portion of the page oriented left in laying out the original page. Since this item is not provided with any "Follow Chapter Attribute" check box and is not a repetitive setting item in the chapter and document, the setting displayed in this window is always adopted as the setting value of the page. When the control 1701 is set, the "Zoom Arrange" item is a repetitive setting item in the chapter, and the setting value of the chapter is used as that of the page. When "Follow Document Attribute" is checked in the "Zoom Arrange" item of the chapter, the setting value of the document in the upper layer is used as that of the chapter, and thus the setting value of the document is used as that of the page. When the "Zoom Arrange" item is not checked in the chapter, the chapter has a unique setting value, and the setting value unique to the chapter is used as the setting value of the page.

Check box control information set in the setting window may be held in a dedicated region, but is desirably held as one attribute in the setting information shown in FIG. 3. In this case, regions for holding check box control information are added to the lists of FIGS. 5 and 6.

<Example of Document Editing Display of Document Processing System According to Embodiment>

Figure 19:
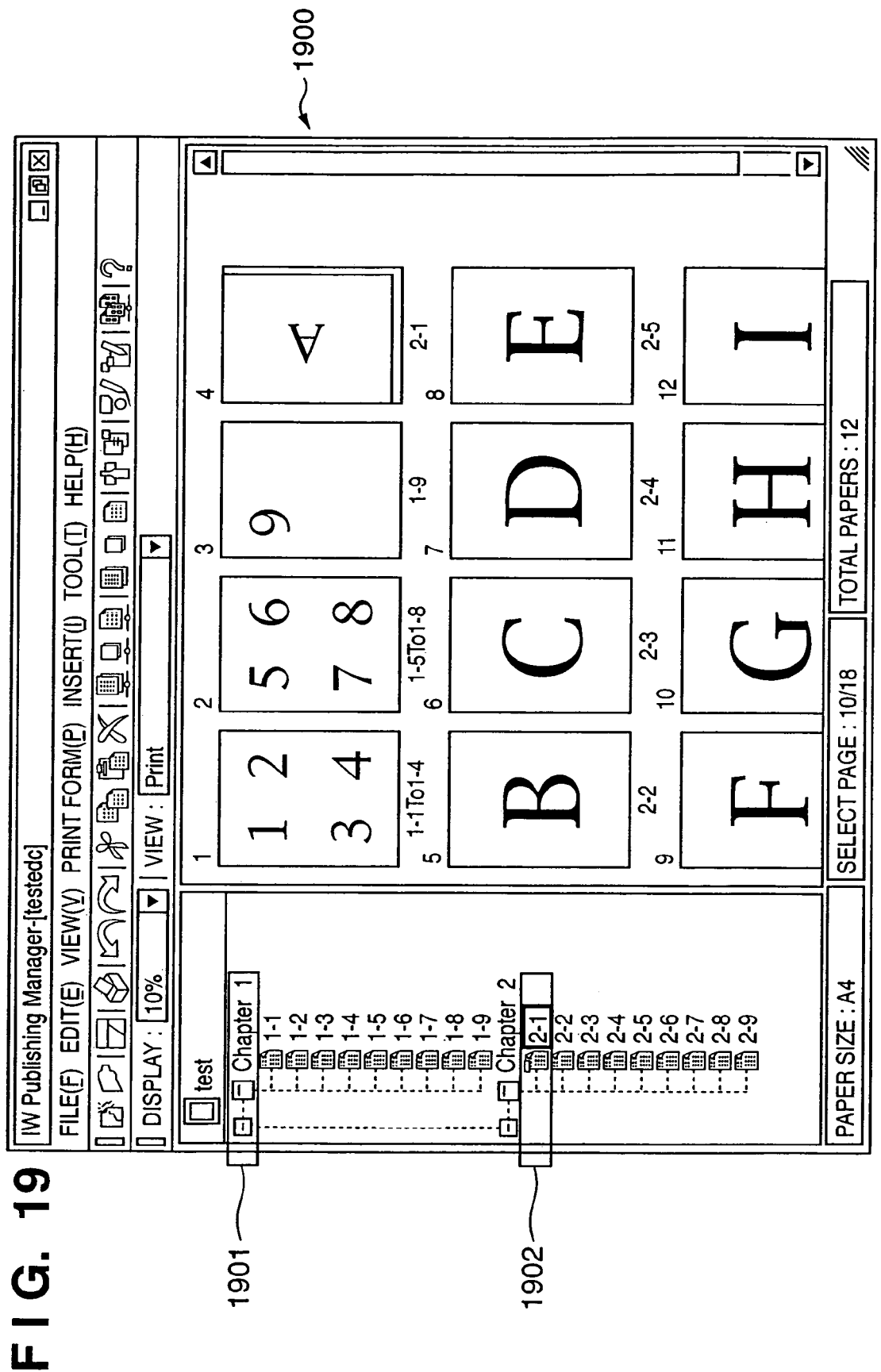
FIG. 19 is a view showing an example of display when settings unique to a chapter and page are done.

FIG. 19 shows an example of the display format of the application when a setting item which is repeated in an upper layer does not use a setting value in the upper layer, i.e., when the check box control 1501 or 1701 is not checked. In the example of FIG. 19, a document is formed from two chapters, and each chapter has document data of nine pages. FIG. 19 shows a display example when the layout of the first chapter is 4UP (to be also referred to as 4in1 hereinafter) and rotation is designated for the first page (10th page in the whole document) of the second chapter. In the right preview, four original pages are laid out on each of the first to third pages. On the fourth page, a character "A" is rotated. A display format for settings unique to a chapter and page at a tree view will be explained. An icon 1901 corresponding to the first chapter changes to exhibit that this chapter has a unique setting. An icon 1902 corresponding to the first page of the second chapter also changes to exhibit that this page has a special setting.

<Sequence of Displaying Document Including Setting Instruction Comment>

Figure 24:
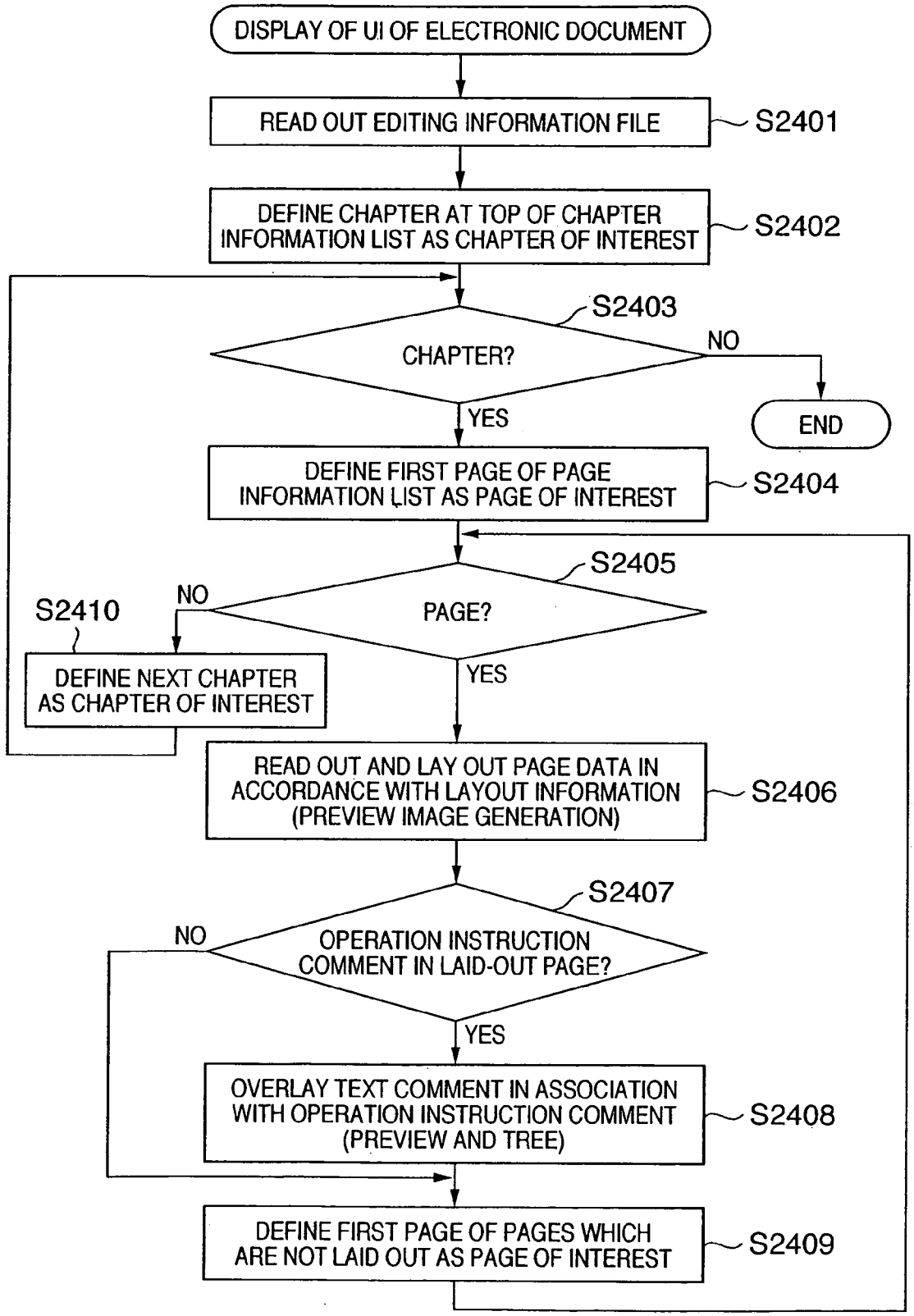
FIG. 24 is a view showing an example of a sequence of displaying a book file to which an operation instruction comment is appended.

FIG. 24 shows an example of a sequence of displaying a document to which an operation instruction comment is appended. In this embodiment, a book file (document information) having an operation instruction comment can be circulated as a book file via a communication medium or recording medium even if no operation instruction comment is applied to the book file. That is, a UI window of a book file opened in accordance with the sequence in FIG. 7 (step S704) is displayed in accordance with a sequence in FIG. 24.

In FIG. 24, an editing information file is read out (S2401), and the top chapter of a chapter information list is defined as a chapter of interest (S2402). To define the chapter of interest, the chapter number of the top chapter may be saved as a parameter representing a predetermined chapter of interest. Next, it is determined whether a corresponding chapter is found (S2403). If YES in step S2403, the first page of a page information list of chapter information of the corresponding chapter is defined as a page of interest (S2404). This operation may be executed in the same manner as that for the chapter of interest. Then, it is determined whether a corresponding page is found (S2405). If YES in step S2405, page information is read out and laid out in accordance with layout information, thereby generating a page image to be previewed (S2406).

After that, it is determined whether an operation instruction comment is appended to the laid-out page (S2407). If YES in step S2407, a text comment is overlaid in association with the operation instruction comment (S2408). If no operation instruction comment is found, or appending of the operation instruction comment is completed, the first page of pages which are not laid out is defined as a next page of interest (S2409). The operations from step S2405 are repeated. A preview image of a corresponding page may be displayed every time a layout corresponding to one print page is completed in step S2406 (or in step S2408 if the operation instruction comment is found).

On the other hand, if it is determined in step S2405 that no corresponding page is found (i.e., the next page is not found), the next chapter is defined as a chapter of interest (S2410). The operations from step S2403 are repeated. If it is determined in step S2403 that no corresponding chapter is found, the process ends.

In this manner, even a book file to which an operation instruction comment is appended can be previewed with the operation instruction comment superimposed.

<Example of Output of Book File>

The ultimate goal of a book file created and edited in the above manner is to print out the file. If the user selects a file menu from the UI window 900 of the bookbinding application shown in FIG. 9 and selects printing from this menu, the book file is then printed out by a designated output device. At this time, the bookbinding application 104 creates a job ticket from a currently open book file, and transfers the job ticket to the electronic document despooler 105. The electronic document despooler 105 converts the job ticket into an OS output command, e.g., a Windows® GDI command, and transmits the command to an output module, e.g., GDI. The output module generates a command complying with a device by the designated printer driver 106, and transmits the command to the device.

The graphic engine of the output module (not shown) loads the printer driver 106 prepared for each printing apparatus from the external memory 211 to the RAM 202, and sets the output to the printer driver 106. The output module converts the received GDI (Graphic Device Interface) function into a DDI (Device Driver Interface) function, and outputs the DDI function to the printer driver 106. The printer driver 106 converts the received output into a control command such as a PDL (Page Description Language) command recognizable by the printer on the basis of the DDI function received from the output module. The converted printer control command passes through a system spooler loaded by the OS to the RAM 202, and is output as print data to the printer 107 via the interface 21.

The job ticket is data having a structure whose minimum unit is an original page. The structure of the job ticket defines the layout of an original page on a paper sheet. One job ticket is issued for one print job. The document node is set at the top of the structure, and defines the attribute of the whole document such as double sided printing/single sided printing. This node is accompanied with a paper node containing attributes such as the identifier of paper for use and designation of a feed port in the printer. Each paper node is accompanied with a sheet node which is printed on the paper. One sheet corresponds to one paper sheet. A print page (physical page) belongs to each sheet. One physical page belongs to one sheet in single sided printing, and two physical pages belong to one sheet in double sided printing. An original page to be laid out on a physical page belongs to the physical page. The physical page attribute contains an original page layout.

Figure 12:
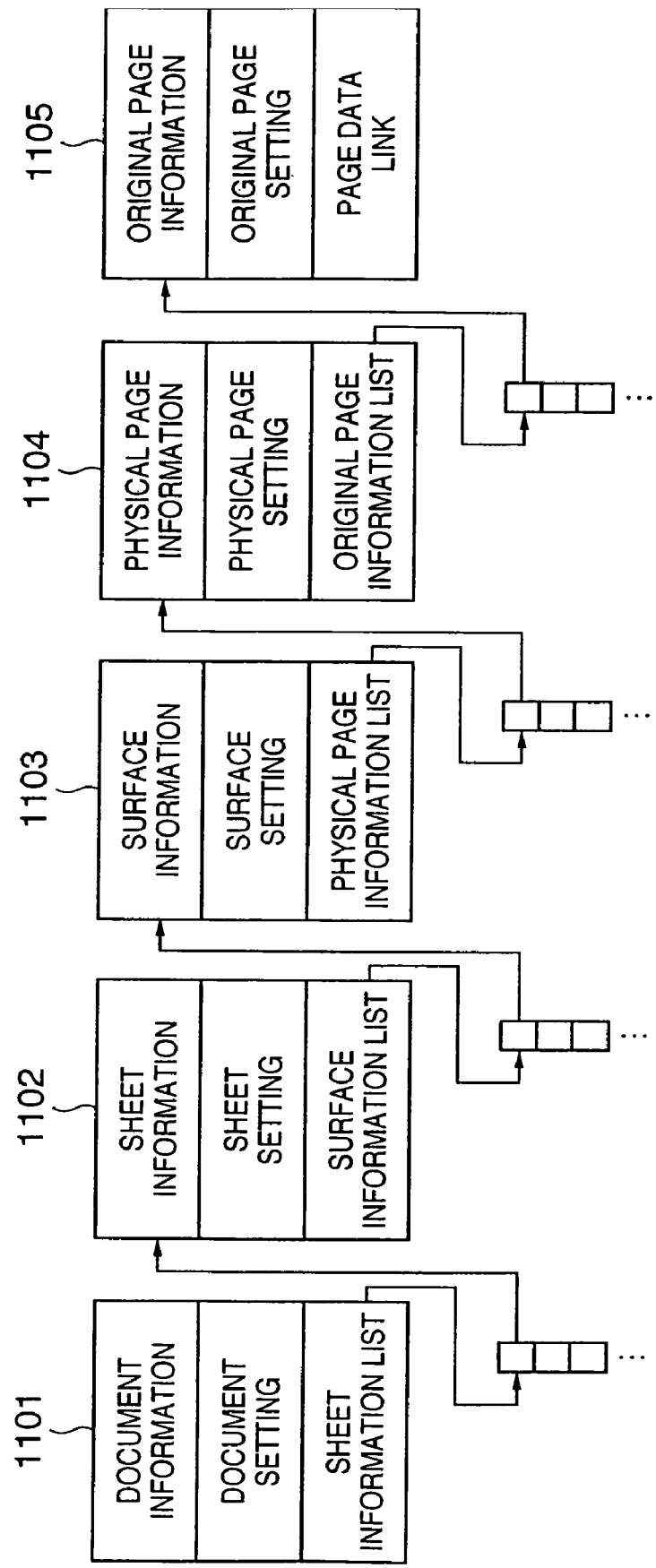
FIG. 12 is a view showing an example of a data structure used for printing and display.

FIG. 12 shows an example of the data structure of a job ticket. In print data, a document is formed from a set of sheets, and each sheet is formed from two, upper and lower surfaces. Each surface has a region (physical page) for laying out a document, and each physical page is formed from a set of original pages serving as minimum units. Reference numeral 1101 denotes data corresponding to a document. The data 1101 is made up of data on a whole document and a list of sheet information forming the document. Sheet information 1102 is formed from information on a sheet such as the sheet size, and a list of surface information laid out on the sheet. Surface information 1103 is formed from data unique to a surface, and a list of physical pages laid out on the surface. Physical page information 1104 is formed from information such as the size and header/footer of a physical page, and a list of original pages which form the physical page.

Figure 13:
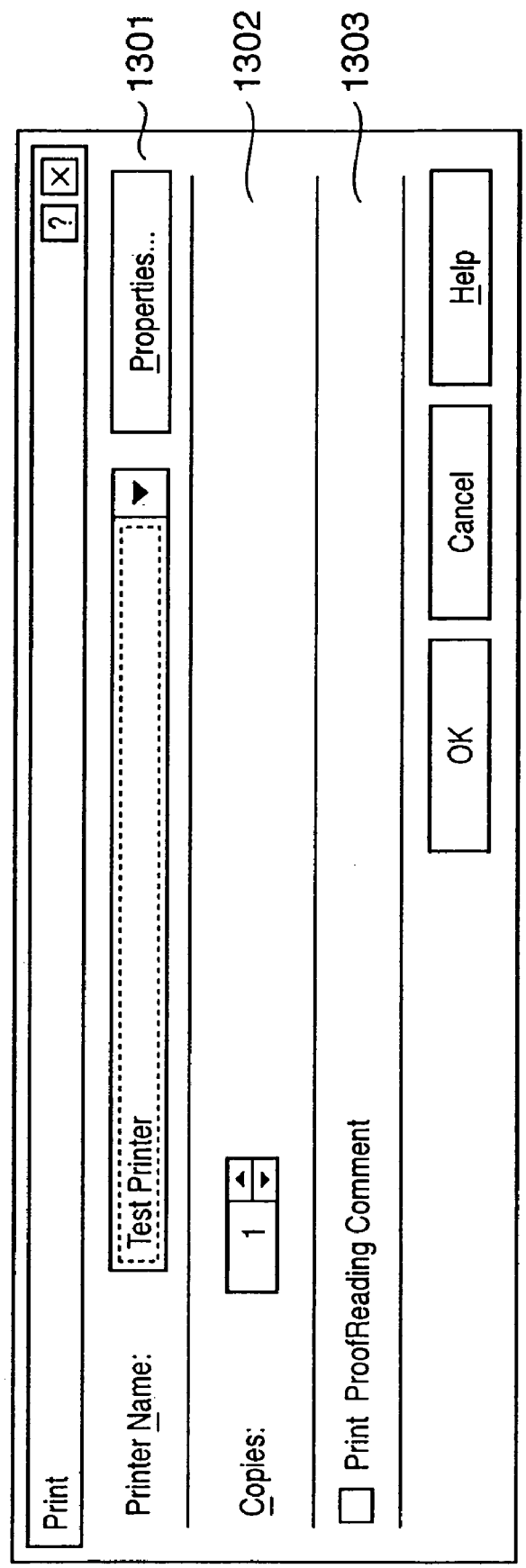
FIG. 13 is a view showing an example of a dialog window for setting a whole document in printing or display.

Moreover, the electronic document despooler 105 converts the above-described job ticket into an output command to an output module. FIG. 13 shows an example of a print setting UI to be displayed in print designation through the UI window 900 of the bookbinding application. The user can make output device setting (1301), print count setting (1302), and the like. These settings are saved in the data 1101 corresponding to a document of a job ticket, and interpreted by the electronic document despooler 105. With this print setting UI, switching whether to print the text comment 2205 in the above-described operation instruction comment (1303) is allowed. When the text comment 2205 is to be printed, a job ticket is created by designating printing of the operation instruction comment for the data 1101 of the job ticket, and the electronic document despooler 105 prints the text comment 2205 in the operation instruction comment.

In this embodiment, even if a document has an operation instruction comment, the contents of the document are not influenced by an unapplied operation instruction comment. In printing, therefore, the text comment 2003 itself is not printed out. The text comment 2003 may be printed while being superimposed on a corresponding page in the same manner as in user interface display, in accordance with the values of a flag and the like which are prepared in the operation instruction comment 601 to indicate, e.g., whether to print the operation instruction comment.

In the flowchart according to this embodiment, preceding and succeeding steps can be exchanged as far as the process can be completed. The present invention may be applied to a system including a plurality of devices (e.g., a host computer, interface device, reader, and printer) or an apparatus (e.g., a copying machine, printer, or facsimile apparatus) formed by a single device.

As described above, according to the present invention, a proofreader can instruct proofreading using a document processing program without directly rewriting an electronic document containing a format and print form, and the creator can be accurately notified of the proofreading instruction. In addition, a creator can rewrite an electronic document on the basis of a proofreading instruction by applying a proofreader's instruction to the electronic document with a simple operation, thus greatly saving labors.

The purpose of the present invention is also achieved when the computer (or the CPU or MPU) of a system or apparatus reads out and executes program codes stored in a storage medium which stores software program codes for realizing the functions of the above-described embodiment. In this case, the program codes read out from the storage medium realize the functions of the above-described embodiment, and the storage medium which stores the program codes constitutes the present invention. The storage medium for supplying the program codes includes a flexible disk, hard disk, optical disk, magnetooptical disk, CD-ROM, CD-R, magnetic tape, nonvolatile memory card, and ROM. The functions of the above-described embodiment are realized when the computer executes the readout program codes. Also, the functions of the above-described embodiment are realized when an OS (Operating System) or the like running on the computer performs some or all of actual processes on the basis of the instructions of the program codes. Furthermore, the functions of the above-described embodiment are realized when the program codes read out from the storage medium are written in the memory of a function expansion board inserted into the computer or the memory of a function expansion unit connected to the computer, and the CPU of the function expansion board or function expansion unit performs some or all of actual processes on the basis of the instructions of the program codes.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-294271 filed on Oct. 6, 2004, which is hereby incorporated by reference herein.

What is claimed is:

1. A document processing system which edits document information including a plurality of groups, comprising:
   a computer processor unit execution:
   a first selecting operation configured to select a first group from the plurality of groups;
   a second selecting operation configured to select a second group from the plurality of groups as a destination of movement of the first group;
   an editing operation configured to select moving processing as editing processing for the selected first group moving to the destination by said first selecting operation;
   a generating operation configured to generate a text comment indicating that the first group is moved to the second group based on the selecting result of said first selecting operation, said editing operation and said second selecting operation;
   a display control operation configured to display the text comment generated by said generating operation superimposed on a preview image of the document information to which the editing processing to move the first group to the second group based on the selecting result of said first selecting operation, said editing processing and said second selecting operation is not applied; and
   a changing operation configured to, when the displayed text comment is selected by a user, change the preview image of the document information to which the editing processing is not applied into another preview image of document information to which the editing processing has been applied.

2. A method for editing document information including a plurality of groups, comprising:
   selecting a first group from the plurality of groups;
   selecting a second group from the plurality of groups as a destination of movement of the first group;
   selecting moving processing as editing processing for the selected first group moving to the destination;

generating a text comment indicating that the first group is moved to the second group based on the selecting result of the first group, editing processing and second group;

displaying the generated text comment superimposed on a preview image of the document information to which the editing processing to move the first group to the second group based on the selecting result of the first group, editing processing and second group is not applied; and when the displayed text comment is selected by a user, changing the preview image of the document information to which the editing processing is not applied into another preview image of document information to which the editing processing has been applied.

3. Document processing software stored on a memory of a computer, said software is executed by one or more processor in said computer to perform the following steps:

selecting a first group from the plurality of groups of a document information;

selecting a second group from the plurality of groups as a destination of movement of the first group;

selecting moving processing as editing processing for the selected first group moving to the destination;

generating a text comment indicating that the first group is moved to the second group based on the selecting result of the first group, the editing processing and the second group;

displaying the generated text comment superimposed on a preview image of the document information to which the editing processing to move the first group to the second group based on the selecting result of the first group, the editing processing and the second group is not applied; and when the displayed text comment is selected by a user, changing the preview image of the document information to which the editing processing is not applied into another preview image of document information to which the editing processing has been applied.

* * * * *